US007130778B1

(12) United States Patent
Connell et al.

(10) Patent No.: US 7,130,778 B1
(45) Date of Patent: Oct. 31, 2006

(54) COMPUTER TOUCH SCREEN RADIO STATION CONTROL SYSTEM

(75) Inventors: John M. Connell, Salem, NH (US); Dennis Mills, Bangor, ME (US); Doug Cyr, Brewer, ME (US); Norman Buck, Orono, ME (US)

(73) Assignee: Media Digital, Inc., Salem, NH (US)

( * ) Notice: Subject to any disclaimer, the term of this patent is extended or adjusted under 35 U.S.C. 154(b) by 1425 days.

(21) Appl. No.: 09/617,695

(22) Filed: Jul. 17, 2000

Related U.S. Application Data

(63) Continuation of application No. 07/474,682, filed on Feb. 6, 1990, now Pat. No. 6,101,324.

(51) Int. Cl.
G06G 7/48 (2006.01)
H04N 7/00 (2006.01)

(52) U.S. Cl. .................... 703/6; 348/461; 348/473
(58) Field of Classification Search .............. 703/6; 348/461, 473
See application file for complete search history.

(56) References Cited

U.S. PATENT DOCUMENTS

| | | | |
|---|---|---|---|
| 3,896,490 A | 7/1975 | Rose et al. | |
| 4,025,851 A | 5/1977 | Haselwood et al. | |
| 4,230,990 A | 10/1980 | Lert, Jr. et al. | |
| 4,521,870 A * | 6/1985 | Babbel et al. | 710/316 |
| 4,528,600 A | 7/1985 | Ishiguro et al. | |
| 4,547,804 A | 10/1985 | Greenberg | |
| 4,639,779 A | 1/1987 | Greenberg | |
| 4,712,191 A | 12/1987 | Penna | |
| 4,986,662 A * | 1/1991 | Bures | 356/621 |
| 5,168,481 A * | 12/1992 | Culbertson et al. | 369/2 |
| 5,191,645 A * | 3/1993 | Carlucci et al. | 345/723 |
| 6,101,324 A * | 8/2000 | Connell et al. | 703/17 |

OTHER PUBLICATIONS

Annual Report (Portions), Dynatech Corp.

* cited by examiner

Primary Examiner—Hugh Jones
(74) Attorney, Agent, or Firm—Akin Gump Strauss Hauer & Feld, LLP

(57) ABSTRACT

A computerized audio or video signal control system controlled by an announcer and having a display of the available signal sources and scheduled events which can be activated, mixed, faded and cued by the announcer in the scheduled order or in an order the announcer desires. The control system provides the correlation between the displayed source or event name, the devices necessary to air the source or event and the routing necessary to air the event or source and then activates the proper devices to perform the task. The control system additionally logs the events actually activated in order.

17 Claims, 32 Drawing Sheets

| ON 02:03 | | FADE COMMUNITY CALENDER 8:00:55 1:15 F6 | | HOLD | KILL | | CBS SHORT | PICK EXTRAS |
|---|---|---|---|---|---|---|---|---|
| SOURCE 00:41 | | ABC NEW 2:10 25 D21 | | CUE | KILL | | CBS LONG | PHONE OFF |
| CART START | | BANK OF N E/AUTO PAYROLL PROC 08:02:35 1:25 #711 | | CUE | MOVE | | CBS CUE | DELAY OFF |
| CART START | | GOLDSTEINS OFFICE FUR 4:00 15 #522 | | CUE | MOVE | | WEATHER FEED | REMOTE SOURCE |
| CART START | | DE PRIS 4:15 | | | | | | BACK TO LOG |
| CART START | | ANOTH 08:05:1 | EBS | | TIE LINE 1 | TIE LINE 2 | DOW JONES | PAGE 3 |
| LIVE | | SPONSO 7:10 | PLNX | | | | | |
| | | | | | | | | |
| | | 08:58:40 | | TOP | BOTM | UP | DOWN | OPTIONS |

| ON 11:39 | COMMUNITY CALENDAR 8:00:55  1:15  F6 | FADE | | | | |
|---|---|---|---|---|---|---|
| SOURCE 10:17 | ABC NEW  2:10  25  D21 | HOLD | KILL | | PICK EXTRAS | |
| CART START | BANK OF N E/AUTO PA 08:02:35  1:25  #71 | CUE | KILL | CBS SHORT | PHONE OFF | |
| CART START | GOLDSTEINS OFFICE F... 4:00  15  #52 | SLUG LINE FOR COPY: HURRICANE GLORIA DEVASTATION | | CBS LONG | DELAY OFF | |
| CART START | DE PRISCO JEWELERS/... 4:15  60  #32 | HURRICANE GLORIA LEFT A WAKE OF DEVASTATION IN ITS PATH. DAMAGES ARE ESTIMATED TO BE 10 MILLION DOLLARS IN THE STATE OF MAINE. THOUSANDS OF PEOPLE STILL HAVE NO POWER. STAY TUNED FOR AN IN DEPTH FEATURE OF THE DAMAGES. **** END OF COPY **** | | | REMOTE SOURCE | |
| CART START | ANOTHER OPINION 08:05:15  1:55  F | | | | SOUNDER | |
| LIVE | SPONSOR BB 7:10  60  OPE | | | | PICK COPY | 1360 |
| | | PAGE 1 | | | BACK TO LOG | 1362 |
| | 09:08:26 | PAGE UP | PAGE DOWN | | OPTIONS | |

COMPUTER TOUCH SCREEN RADIO STATION CONTROL SYSTEM

BACKGROUND OF THE INVENTION

1. Field of the Invention

The invention relates to the field of control systems, especially those used in audio and video production and broadcast facilities.

2. Description of the Prior Art

In the past, the audio or video production or broadcast systems included a manually controlled mixing and switching board. These boards were complex and hard to use, requiring skilled operators. The boards were complex because of the large number of available inputs or sources, the multiple outputs available and the options available for each source. The complexity of the system caused errors to be made frequently. Therefore it was desirable to reduce the complexity of the system and the skill level required of the operator to ease programming and reduce the number of mistakes.

One approach to this problem was to fully automate the station by having a computer replace all the operators and oversee the entire operation of the station. A scheduled log of events was entered into the computer and the required tapes were manually loaded in the proper tape units. The computer was programmed to activate the right series of devices at the right time. Problems arose with this type of system because the operators failed to correctly load the taped source material, mechanical malfunctions occurred or there was a need to rapidly rearrange the schedule of events. The computer had limited options in these situations and often could not respond correctly.

Additionally, the static nature of a fully automated system was not acceptable because it was often desired to have a more flexible program environment, one that could be changed by an operator to fit the situation as it arose, be it requests for songs, programs running long or emergency bulletins. This flexibility was readily obtainable in a standard system, but the skilled operator requirements reappeared. Therefore it was desirable to have a system that was flexible but did not require highly trained operators or produce the frequent errors which occurred in manual control boards.

To accommodate advertising and management functions, a broadcast control system also had to provide an accurate log of the actual programs that were played over the air or used in the editing process. Manual systems were inadequate because they required the operator to make a manual log entry for each event which sometimes took more time than was available. Furthermore, manually kept logs were inaccurate since the operator frequently forgot or was unable to make log entries, especially in situations where programming changes and activities were at a peak. Therefore, a control system which automatically logged programs as they were broadcast was highly desirable.

SUMMARY OF THE INVENTION

The basic system of the present invention uses a computer integrated with a touch screen to replace the mixing and routing board in a radio or television station or production facility which permits the broadcast announcer to perform the program mixing and routing tasks without the need for a skilled operator. The touch screen displays the scheduled events, their length and scheduled air time. The system allows the announcer to change events to different time slots, to cancel events, to cue events for review prior to actual airing, to initiate events immediately and all other functions necessary to control and log programming of a radio, television or production broadcast. The announcer need not know the actual buttons to push and knobs to turn to cause a given event to be aired, but need only know the event, the desired location to which to send the event and occasionally the source of the event. The announcer does not even have to activate any switches because the computer does the mixing and routing from information stored in its memory.

The complete system has a number of computers linked together to process information and control devices. The hub of the system is a central computer which is linked to the other computers in the system and provides a central file storage facility. Connected to this central computer are director computers, news computers and a touch screen computer. The central computer communicates with the other computers in the network as necessary or as requested.

The director computer can communicate with a billing or accounting computer to receive log data that is automatically generated by the billing system or from other sources, such as floppy disk transfer or direct entry. The program director then manually enters the remaining desired log entires and manipulates the log to provide the final program schedule. This log development is generally done one to two days before the program is aired to allow time for changes and planning. The completed program information is then transmitted to the central computer for storage and transmission to the touch screen computer as necessary.

The news computer is connected to wire services to obtain syndicated stories from the wire services. The news computer captures the copy and allows the news editor to edit and modify the copy to actually be read on-air. The finished copy is then transmitted to the central computer for storage and transmission to the touch screen computer or for further editing by the program director in the director computer.

The touch screen computer is the computer that drives the touch screen display and interacts with the announcer. The touch screen computer receives the scheduled program log from the central computer on a regular basis, such as once an hour. This allows the announcer to preview upcoming events and easily reschedule them if desired. The announcer then interacts with the touch screen computer, controlling and airing the events. The touch screen computer controls the external devices that perform the playback, routing and switching of program events. The touch screen computer stores program identification as program events are aired and transmits this information to the central computer. The central computer maintains the program information in a file which is transmitted to the director computer on a regular basis for printing of the aired events log.

The detailed description will further explain the various interconnections of the hardware and the interface with the software. A more detailed explanation of the options available to the announcer and when they can be used will be explained along with a short example of a programming sequence.

BRIEF DESCRIPTION OF THE DRAWINGS

FIGS. 13–18 are illustrations of displays generated on a computer screen in a system according to the present invention.

DETAILED DESCRIPTION OF THE PREFERRED EMBODIMENT

Table of Contents

I. Overview of the System
II. System Hardware
III. Operation of the System
  A. Introduction
  B. Director/Editor Station
  C. Touch Screen Station
    1. Initialization
    2. Main Program Sequence
    3. TIMER Sequence
    4. Screen Update
    5. File Handler Sequence
    6. MESSAGE Sequence
    7. TRAYIN Sequence
    8. OLOGER Sequence
    9. LOGER Sequence
    10. LOOKXTRA Sequence
    11. TRAYOUT Sequence
IV. Example Programming Sequence
V. Conclusion
I. Overview A radio or television station receives broadcast and scheduling information from a large number of sources. The sources of broadcast information include the wire services, locally composed copy and prerecorded tapes and records. Scheduling information for items such as advertisements and sponsored shows usually comes from the marketing or accounting departments. Typically, the program director defines events to be aired and the announcer is permitted to make adjustments to the program sequence or schedule.

The present system uses an integrated computer network comprising several different computer systems with specialized computer programs controlling each of the various computers to allow the computers to perform their desired functions and to interact with the other computers in the system. The news department computer is programmed to receive the news copy and the weather copy from the various wire services, and to permit editing of the received copy to create local copy for broadcast. The marketing and accounting department computer is programmed to permit the operator to insert special shows into the program and to devise the preferred advertisement scheduling. The program director, in combination with various announcers, using his computer, then fills in the remaining portions of the schedule of events, referred to as the log, that have not been previously filled in by the marketing, accounting and news departments.

At this time a scheduled log of events for a given period is prepared and given to the various personnel responsible for airing and broadcast. These personnel include the various people used to place the correct events in the correct playback units and the persons in charge of connecting the sources to the switching/mixing console. The switching/mixing console provides the audio signal control and switching necessary to connect the proper source units to the desired output, be it a main transmitter, an auxiliary transmitter or one of the station monitors.

The present invention is a computer system which simplifies the task of the program director by facilitating log development and greatly simplifies the announcer's task by allowing a computer to handle the source selection, the switching and mixing and the output source selection. The actual device control can be done fully automatically from the log generated by the program director or can be an automated assist to an announcer who selects the desired event and can thereby easily change the scheduled log.

Figure 1:
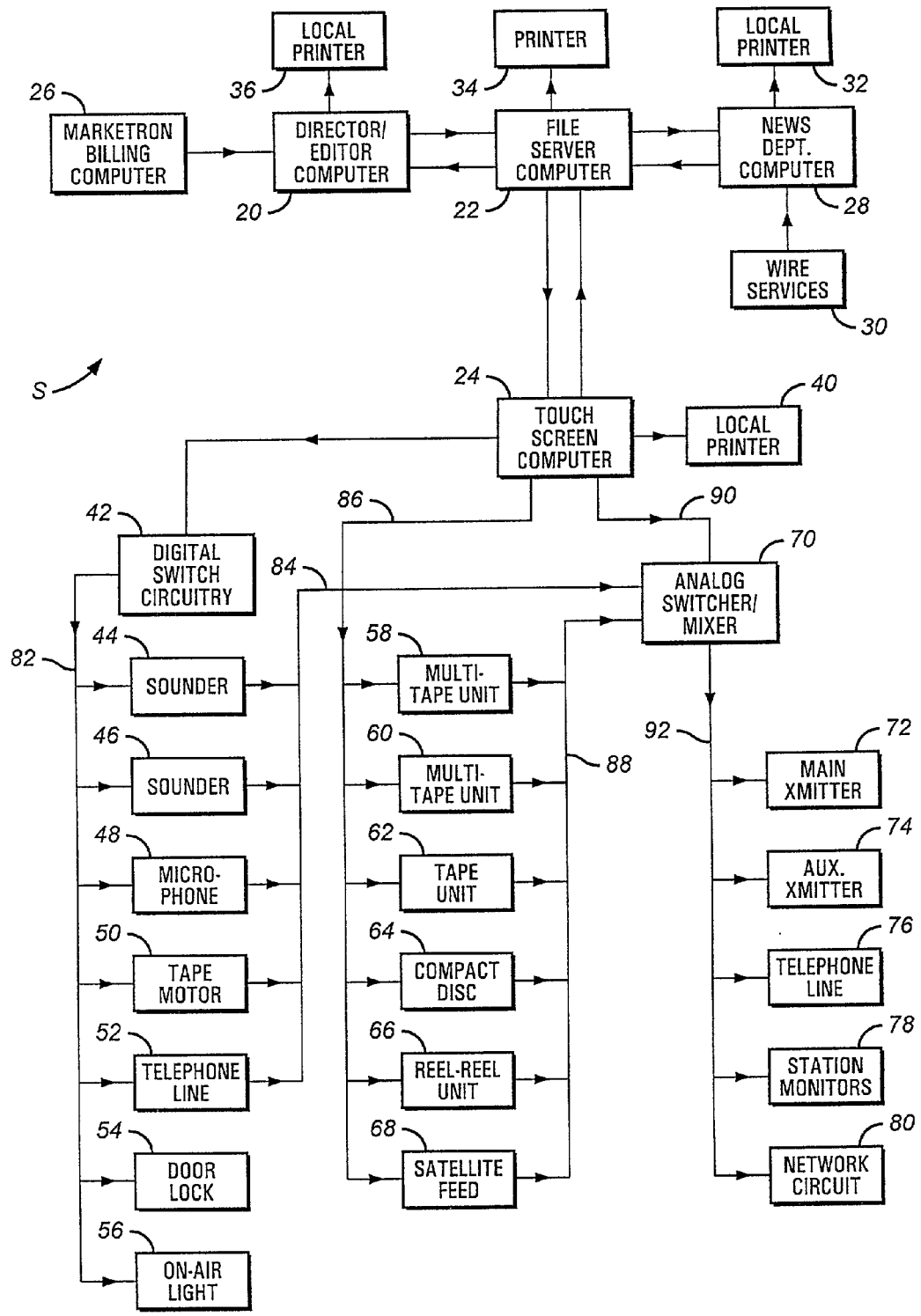
FIG. 1 is a block diagram of a system according to the present invention.
Figure 2A:
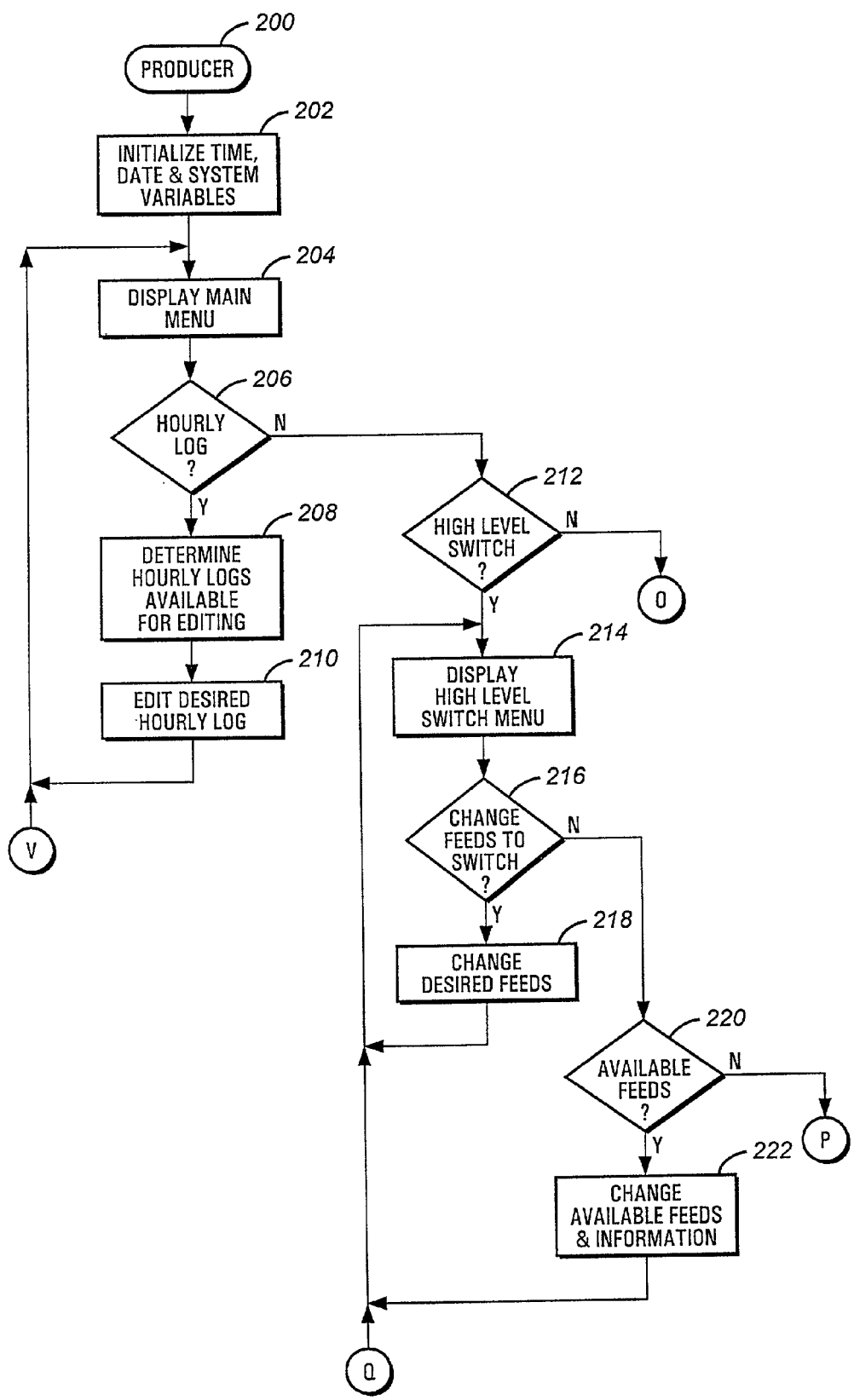
FIGS. 2–12 are schematic flowchart illustrations of portions of the operating sequence of a system according to the present invention.
Figure 2B:
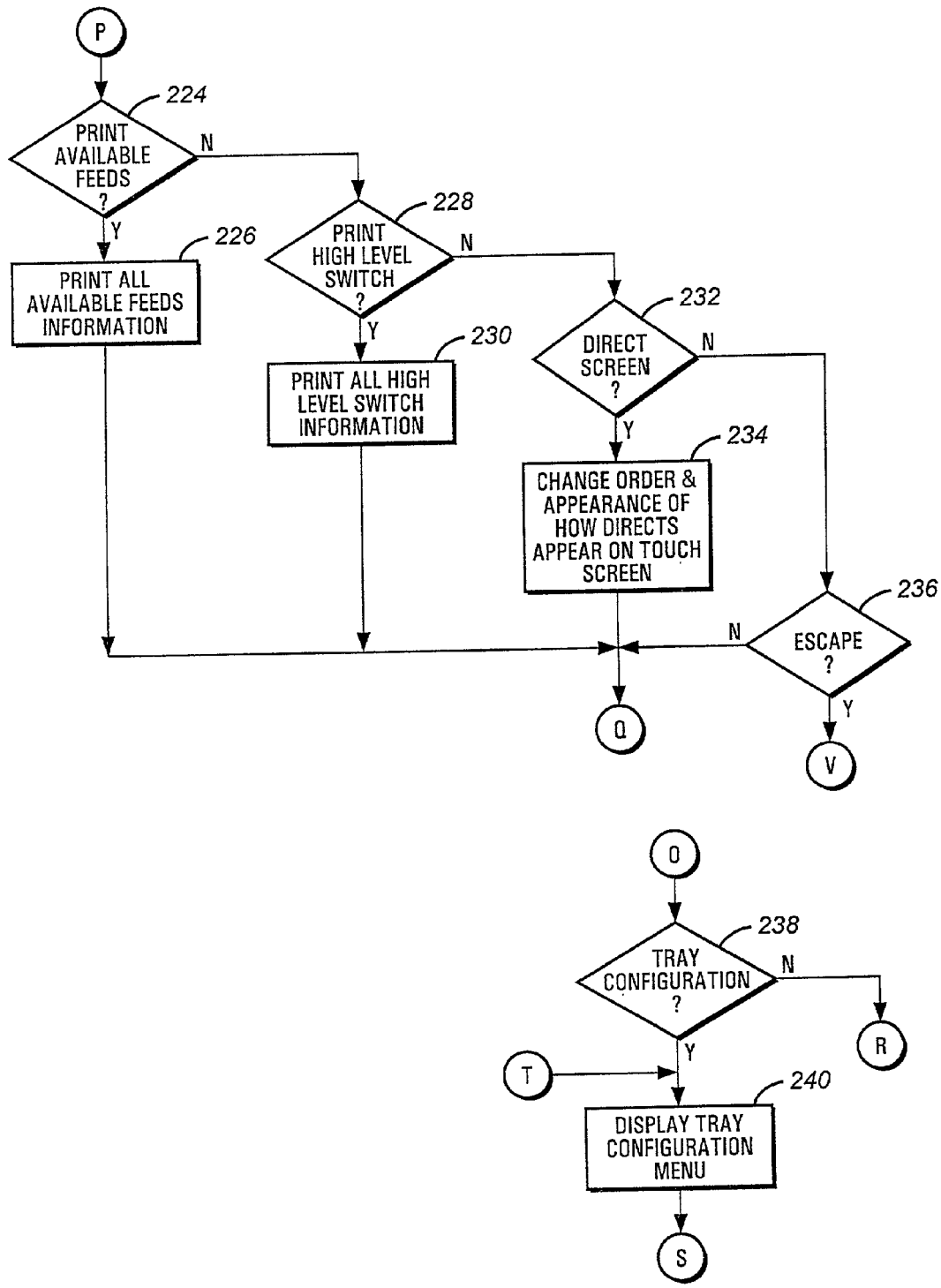
Figure 2C:
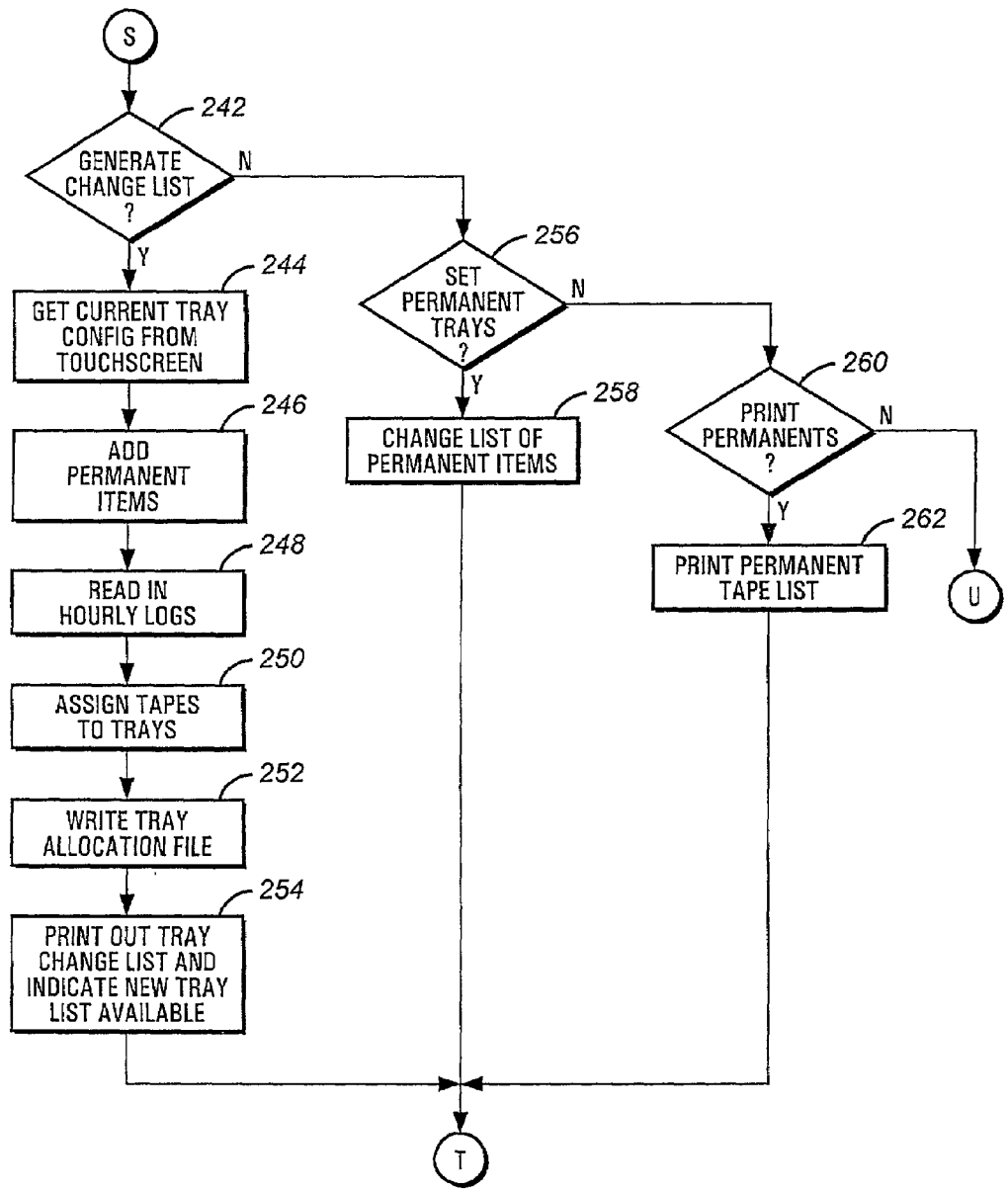
Figure 2D:
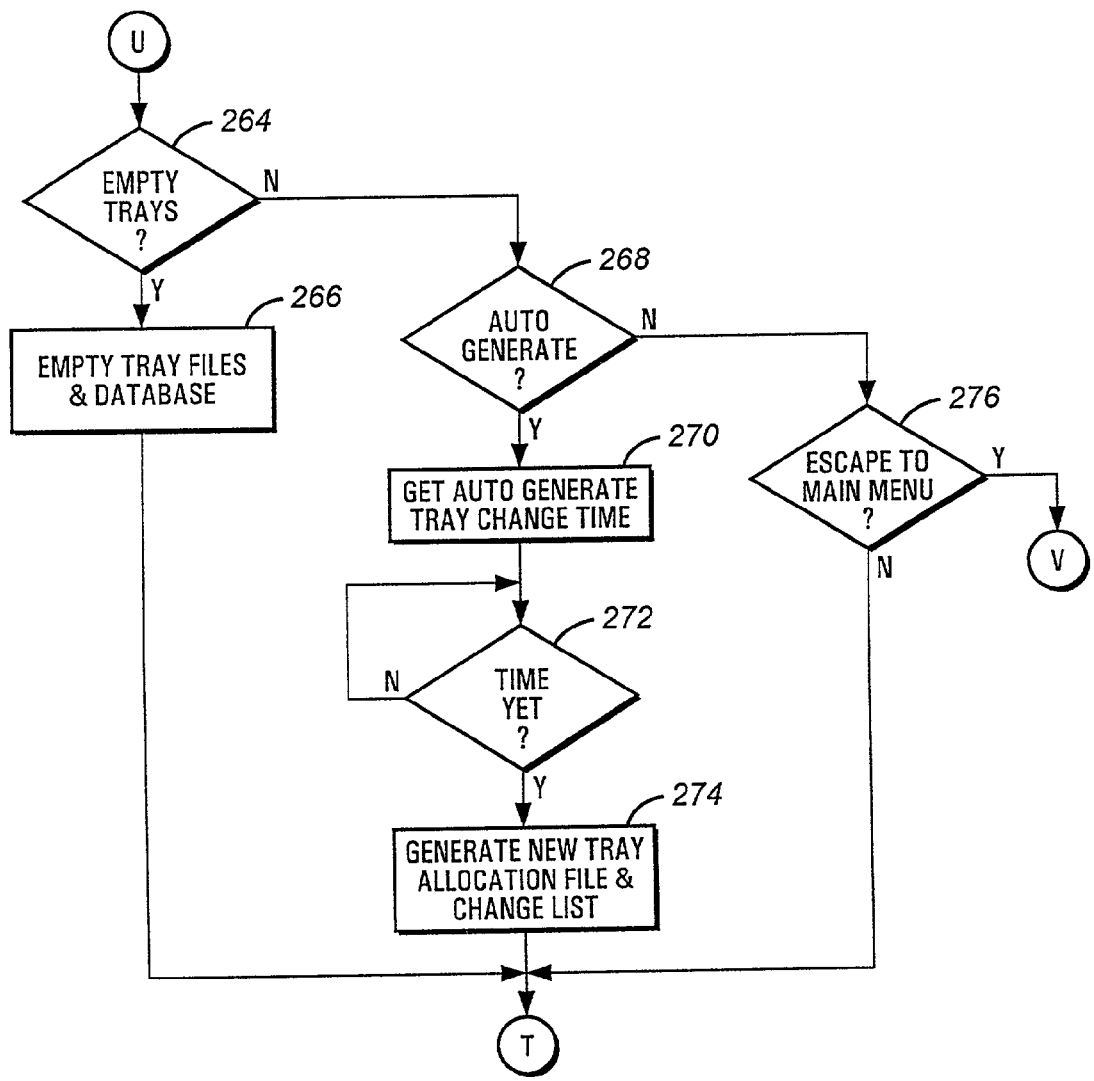
Figure 2E:
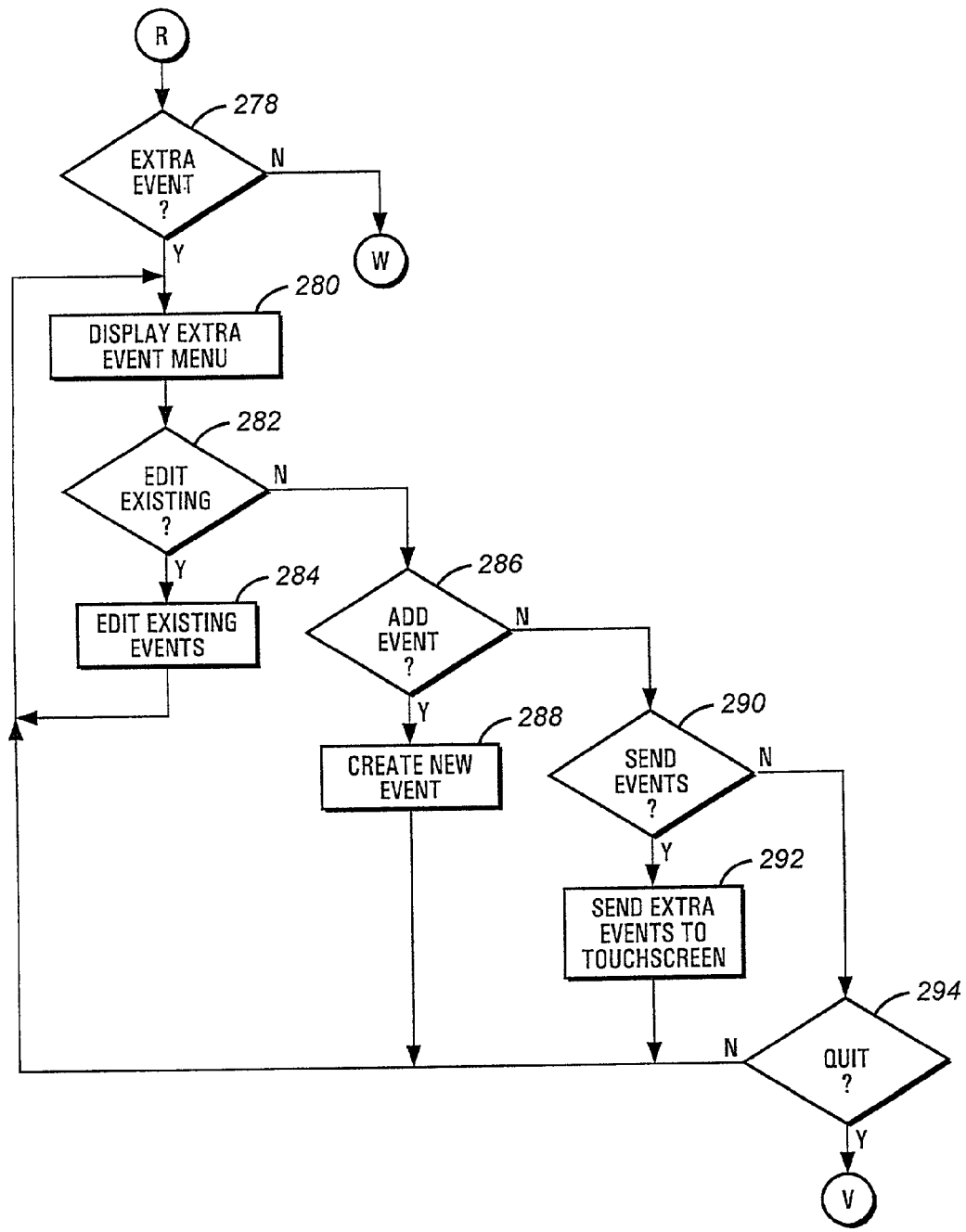
Figure 2F:
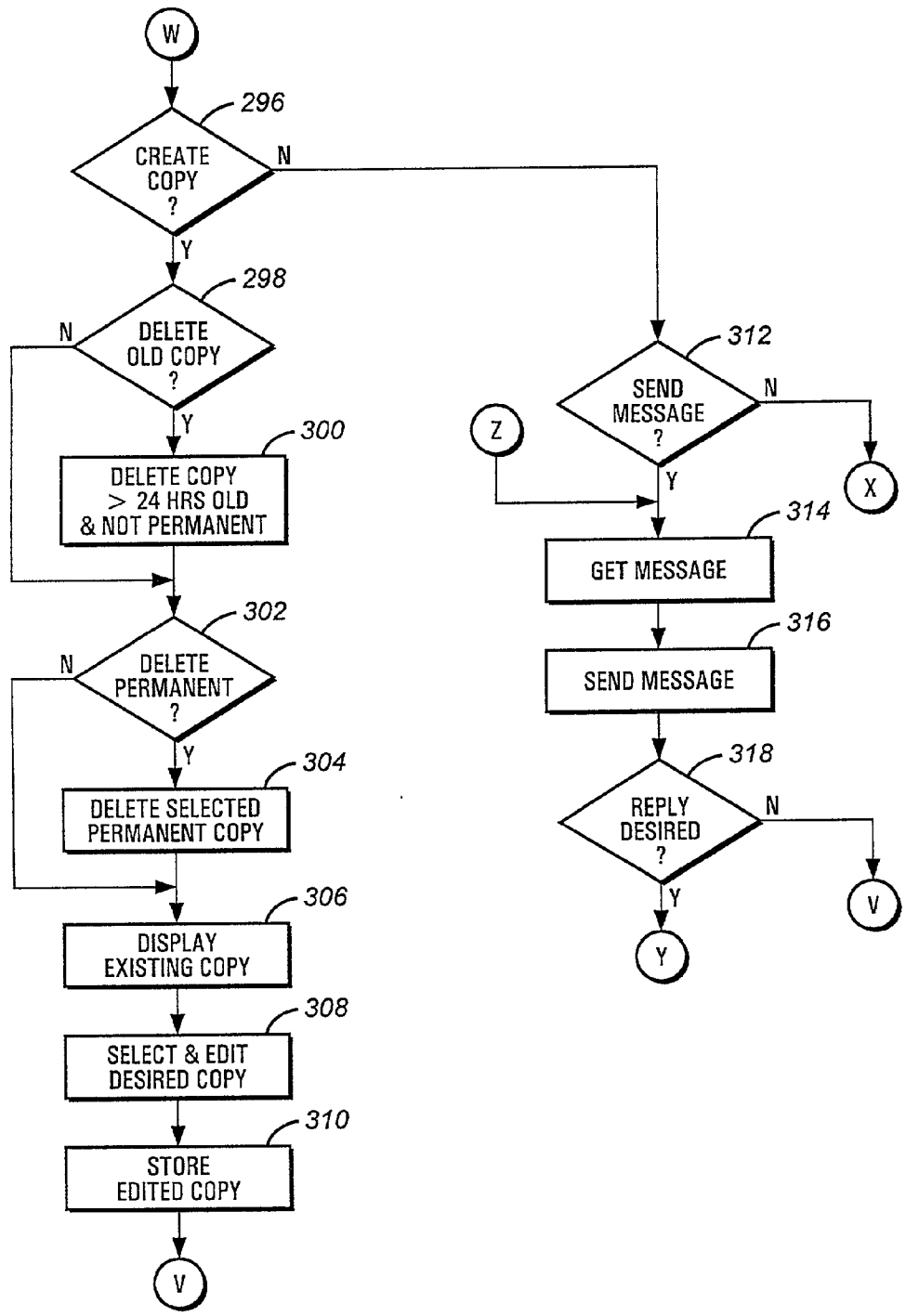
Figure 2G:
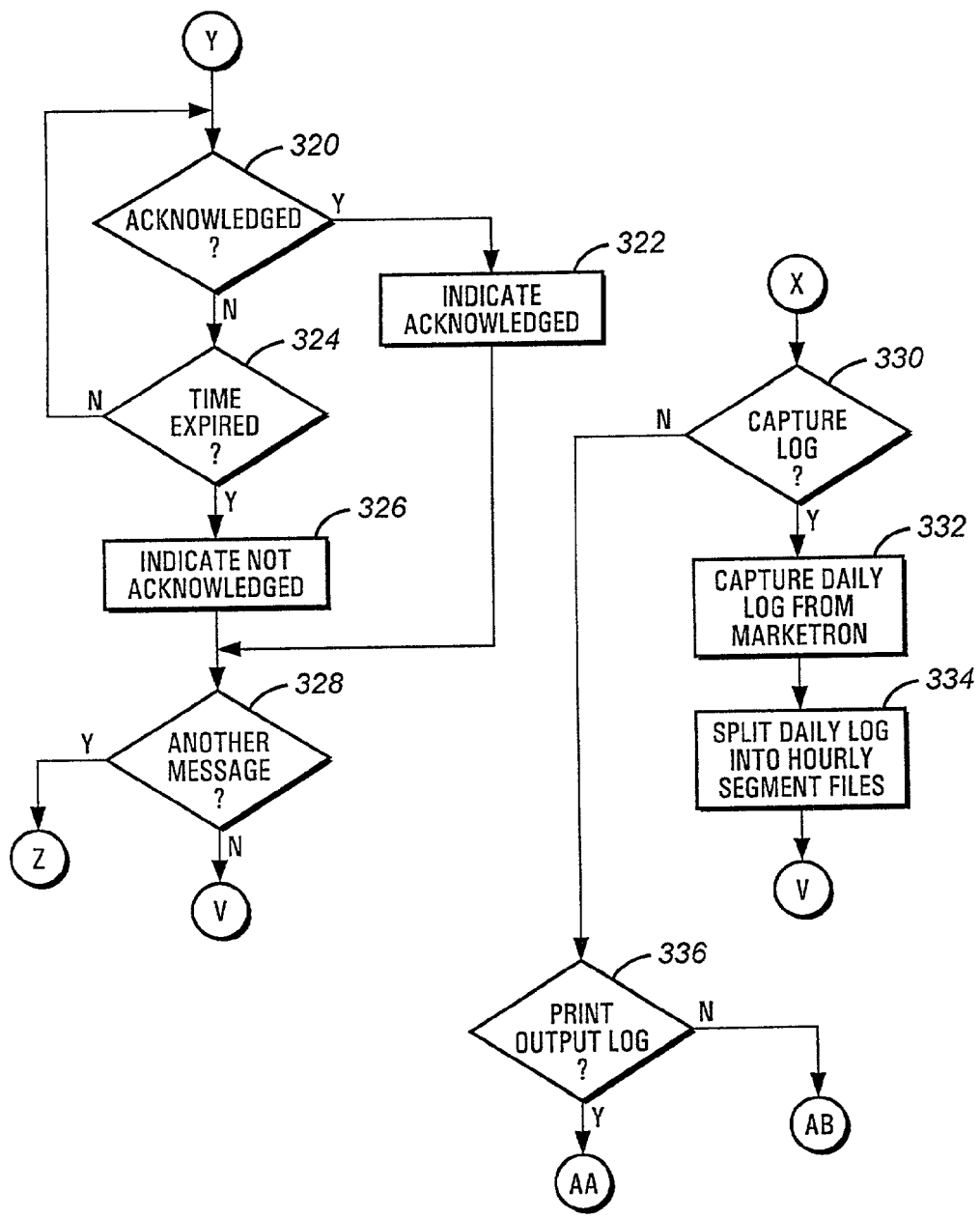
Figure 2H:
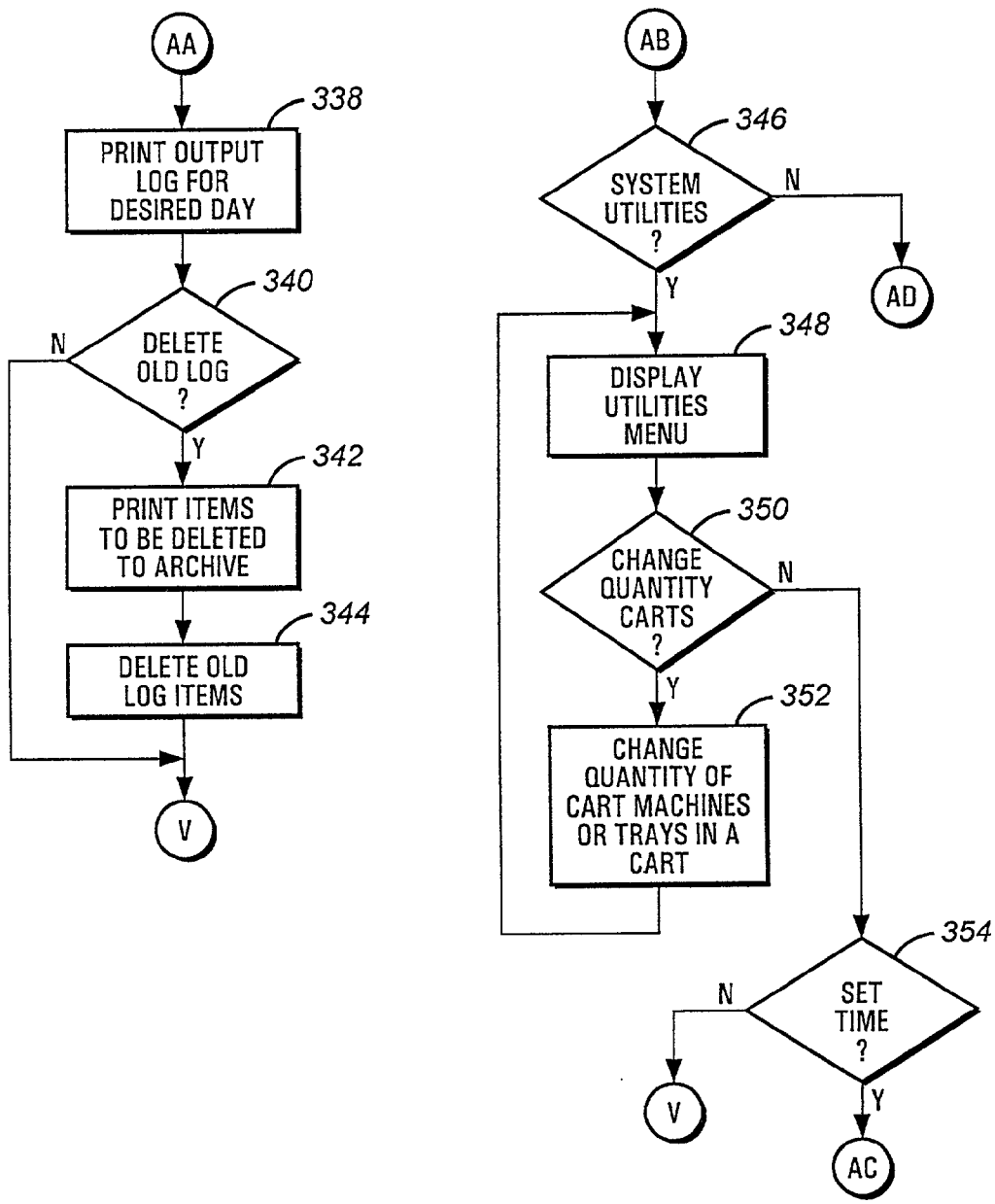
Figure 2I:
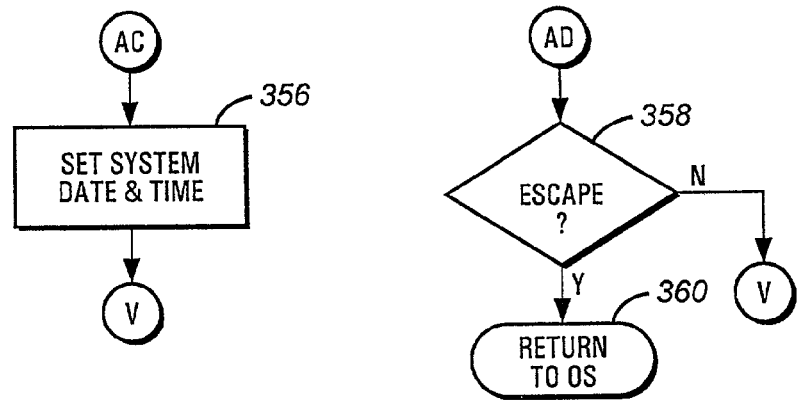

II. System Hardware Referring now to FIG. 1 the system is generally represented by the letter S. The system S is comprised of five different computers, a director/editor computer 20, a file server computer 22, a touch screen computer 24, a billing computer 26 and a news department computer 28.

The news department computer 28 is connected to a wire services 30 so that the incoming news and weather reports are automatically entered into the news department computer 28 and converted into a format that allows editing by the news department. After receiving the stories from the wire services 30, the personnel in the news department can edit or delete copy received or create new copy based on local stories or received stories. The news department computer 28 can be connected to a local printer 32 to allow printing of the copy for editing and archiving purposes. After copy editing has been completed, the news department computer 28 transmits the finished copy to the file server computer 22. The file server computer 22 creates a file containing the copy that it has received so that the program director can further edit the copy or the copy can be transmitted to the touch screen computer 24 to be read by the announcer.

The billing computer 26 permits the marketing and accounting departments to enter and compile their needs and scheduling for advertisements and various special events for which they are responsible. Computers programmed to perform this function are commonly available. In these prior art systems, after the marketing and accounting departments entered their scheduling requests, the billing computer 26 caused this information to be printed on paper or on magnetic storage media such as a magnetic disk in the form of a log which would be given to the program director for his use in scheduling events. In contrast, in the present system the printer output of the billing computer 26 is connected to an input of the director computer 20 with the director computer 20 being programmed to emulate a printer. A program in the director computer 20 is activated to capture the various log entries being transmitted from the billing computer 26 to what the billing computer 26 thinks is its printer, thereby allowing the director computer 20 to generate a file of the scheduled log events without the need for retyping the scheduled events.

The director computer 20 is used by the program director to prepare a complete scheduled log of events for the next day and perform system supervisory functions. These supervisory functions include changing certain reconfigurable elements displayed on the touch screen computer 24; providing the necessary hardware correlation information to allow the touch screen computer 24 to activate the correct source device from a given code abbreviation attached to each event in the log; allowing the program director to assign the locations of certain sources, either on a temporary or on a permanent basis; allowing the program director to edit any copy produced by the news department computer 28; allowing the program director to communicate with the announcer by presenting messages on the touch screen computer 24; obtaining printouts of various files contained in the system and other duties as will be more fully explained. The director computer 20 is connected to the file server computer 22 to allow data contained in the many files used in the system S to be transferred back and forth between the director computer 20 and the file server computer 22. The director computer 20 is also connected to a local printer 36 to allow local printing of the desired items.

The file server computer 22 is the hub of the computer network and the location where the various shared files are stored. Storing the shared files in the file server computer 22 allows all of the various computers connected to the file server computer 22 access to the shared files. The file server computer 22 can be connected to a printer 34 to allow printing of information contained in its files thereby reducing the communication overhead and the printing time required than if all files had to be printed over a local printer attached to one of the other computers in the system S.

The touch screen computer 24 provides control of the various source devices, the switcher/mixer 70 and information routing to the desired outputs. Touch screen computer 24 also provides an interface to the announcer to present him with copy to read, any messages from the program director, and the scheduled log. Touch screen computer 24 is programmed to allow the announcer to acknowledge any messages from the program director, control a number of the sources directly and modify the scheduled log as needs arise. Touch screen computer 24 can be connected to a local printer 40 to allow the announcer to print out desired information.

Information and data sources in the system S and connected to touch screen computer 24 may be classified as intelligent sources and non-intelligent sources. Intelligent sources have a device identification number and respond only when addressed directly and not when the touch screen computer 24 is communicating with other devices. The touch screen computer 24 communicates with these devices over the intelligent bus 86 which is connected to the various intelligent sources, examples of which are multi-tape units 58 and 60, tape unit 62, compact disc player 64, reel to reel tape unit 66 and satellite feed unit 68. The touch screen computer 24 communicates with non-intelligent sources via the digital switch circuitry 42 which then energizes the proper lines in the non-intelligent bus 82 to energize the proper source. Examples of the non-intelligent sources include sounders 44, 46, microphone 48, tape motor 50, telephone line 52, door lock 54 and on-air light 56.

Multi-tape unit 58, 60 may be any suitable conventional multi-tape such as are commonly available in the trade. Multi-tape unit 58, 60 has the capability of storing a number of different taped events in separate trays with each tray having a separate and independent address in that particular unit. The touch screen computer 24 would activate a particular tape by sending out the address of the desired multi-tape unit and the particular tray to be activated in that tape unit.

The compact disc player 64 is similar to multi-tape unit 58, 60 in that a number of different tracks can be programmed to be played by the unit and therefore the touch screen computer 24 sends the compact disc player 64 the compact disc address and the desired track sequence to be played.

Sounders are generally simple noise makers that need only be triggered to produce a desired sound for either the amount of time they triggered or for a fixed time after they are triggered. Examples of sounders include teletypes and chimes on the hour.

Microphones can be any microphone in the station which is directly controllable, allowing the touch screen computer 24 to energize the proper announcer's microphone only when needed.

The telephone line 52 is an external telephone line to allow call-in listeners to be broadcast, as is necessary if the radio station is doing a call-in talk format or other over-the-telephone interviews.

Touch screen computer 24 can also be used to control other simple, non-audio devices that exist around the station such as a door lock 54 or an on-air light 56. Control of simple devices like this which do not produce an audio signal could be extended as required as can be readily understood by those skilled in the art.

The various audio sources generally have their output signal levels set individually at the respective source, but individual volume controls can be added if desired and can be controlled by touch screen computer 24. The broadcast level is controlled by standard automatic gain control, compression and limiting circuitry located after the switcher/mixer 70 and before the respective transmitter.

All of the various audio sources have their audio outputs connected to analog switcher/mixer 70. The switcher/mixer 70 is controlled by touch screen computer 24 over the control bus 90. Switcher/mixer 70 is designed to allow any of the various input sources to be connected to any of the various output channels as desired by the announcer and controlled by touch screen computer 24. In addition, switcher/mixer 70 allows the various signals to be mixed and combined for transmission on a single output channel. For instance, with the system of the present invention it is possible to fade or reduce the volume level of a background traffic noise sounder which is being input to the switcher/mixer 70 on one channel, keep an announcer's microphone activated at a higher volume level while the announcer is broadcasting a traffic report and mix these two channels to provide a traffic report with background traffic noise.

Switcher/mixer 70 may be selectively connected to various output devices over the output bus 92, examples of which are a main transmitter 72, an auxiliary transmitter 74, a telephone line 76, a station monitor bus 78 and a network circuit 80. The station monitor bus 78 allows programs to be cued for review by the announcer while another event is being transmitted over the air over the main transmitter 72. The network circuit 80 allows several different radio stations to connect with each other as desired to form a network and thereby share events as required.

III. Operation of the System

A. Introduction

The system software is partitioned to reside in four main locations, the director computer 20, the touch screen computer 24, the news department computer 28 and the file server computer 22.

The file server computer 22 software oversees communication between the file server computer 22, the director computer 20, the touch screen computer 24 and the news department computer 28. The file server software also includes routines for storing and retrieving data from data storage devices such as floppy disks, hard disks and tape drives. Another element of the file server software is a printer interface to allow printing of information as directed by the various computers tied to the file server computer 22.

The news department computer 28 software is primarily for word processing with features for communication with file server computer 22 and the wire services 30.

The director computer 20 is used to generate the log, the system hardware mapping, to address the tape cartridge locations and to communicate with the touch screen computer 24 via the file server computer 22. The details of the software responsible for these tasks of the director computer 20 are explained below.

The touch screen computer 24 provides real time control of the hardware devices and interfaces with the announcer to allow human oversight and with the file server computer 22 to obtain data. The numerous routines that comprise the touch screen computer 22 software are explained in greater detail below.

B. Director/Editor Station

The sequence that controls the operation of the director computer 20 is the producer sequence 200 shown in FIG. 2. The producer sequence 200 begins execution at step 202 which causes director computer 20 to initialize the time, date and system variables. This is followed in step 204 by the display of the main menu of this menu driven system. The main menu is presented on a display screen of the director computer 20 listing the various functions available and requesting the desired function to be performed. The available functions are hourly log, high level switch, tray configuration, extra event, create copy, send message, capture log, print output log, system utilities and escape.

After the program director has entered the desired function to be performed via a keyboard attached to the director computer 20, step 206 tests to see if the hourly log function is desired. The hourly log function is used by the program director to edit the hourly logs of program and event listings, allowing the program director to change the schedule as received from the billing computer 26 and to add events as desired. If the hourly log is desired, step 208 determines which hourly logs are available for editing and step 210 allows the program director to edit the hourly log of his choice. After the edit is finished, control returns to step 204 which displays the main menu.

If the program director did not opt to edit the hourly log, step 212 causes director computer 20 to determine if the high level switch function is desired. The high level switch function is used by the program director to define the hardware system by detailing which sources are available and which sources are connected to which locations of the switcher 70. This function can be protected by a password for security purposes so that only desired person can enter this routine. If the high level switch function is selected, control proceeds from step 212 to step 214 which displays the high level switch menu and the options available under this function. The options are change feeds, available feeds, print available feeds, print high level switches, modify direct screen and escape.

After the program director indicates the desired option, step 216 causes computer 20 to determine if the change feeds to switch option is desired. This option allows the program director to change where a given source inputs to the switcher 70 to allow development of the data base and mapping function required by the touch screen computer 24 to control the sources and the mixer 70. If this is the option desired, the computer 20 interacts with the program director in step 218 to change the desired feeds to the correct locations. After the feeds are assigned, control returns to step 214.

If the change feeds option is not selected, step 220 causes computer 20 to determine if the available feeds option is chosen. The available feeds option provides the program director with a display and description of the sources available and how they are controlled or activated, be they intelligent or non-intelligent sources. This is information required by the touch screen computer 24 to correlate the hardware with the desired event. If the available feeds option is selected in step 220, the computer 20 interacts with the program director in step 222 to change the available feeds and the information on the sources and their control. After the source information has been updated, control returns to step 214.

If the available feeds option is not chosen, control proceeds to step 224 which causes computer 20 to determine whether the program director has selected the print available feeds option. If this is the option selected, step 226 causes the computer to print all of the available feeds information for archiving or other purposes. After the printing has been completed, control is transferred to step 214 for redisplay of the high level switch menu.

If the program director has not selected the available feeds option, step 228 causes computer 20 to determine whether the print high level switch option is selected. If this option is selected, step 230 directs the computer 20 to print all of the high level switch patch information so that the audio network topology can be determined and reviewed. After the printing is finished in step 230, control returns to step 214.

If the program director has not elected the print high level switch option in step 228, step 232 causes computer 20 to determine if the direct screen option has been selected. This option is used by the program director to change the order and appearance of how the direct options appear on the touch screen display for use by the announcer. The actual direct sources and how they are used will be explained in the discussion of the touch screen station. If this is the option selected, the computer 20 interacts with the program director in step 234 to change the order and appearance of how the direct options appear on the touch screen computer 24 and in the various menus and overlays available on the touch screen computer 24. After the display modifications have been completed, control returns to step 214 for high level menu display.

If the program director has not chosen the direct screen option, step 232 transfers control to step 236 which interrogates to see if the program director has chosen to escape from this menu. If not, step 236 passes control to step 214 and the high level switch menu is redisplayed. If the program director has chosen to escape, control passes to step 204 and the main menu is redisplayed.

If the high level switch function is not desired as determined in step 212, control proceeds to step 238 which causes computer 20 to determine if the tray configuration function is desired. The tray configuration function is used by the program director to generate tray change lists, assign permanent tray allocations, print permanent tray allocations and empty all the trays. This allows the program director to assign specific tape cartridges to specific trays of the correct multi-tape unit so that the touch screen computer 24 can activate the correct source.

If the tray configuration function is selected, control proceeds to step 240 which causes computer 20 to display the tray configuration menu listing the various options available to the program director. The program director indicates his desired option and step 242 interrogates to determine if the program director has opted to generate a tray change list. If the tray change option is selected, step 242 passes control to step 244 where the director computer 20 requests the tray configuration for the current hour from the touch screen computer 24. This is done by storing a particular value in the file server computer 22. Throughout operation of system S, touch screen computer 24 periodically determines if this particular value exists in the memory of the file server computer 22. If the particular value does exist, the touch screen computer 24 generates the required tray allocation in the TRAYOUT sequence 900 as will be fully explained later.

After the current configuration of the tape cartridges to be used in the current hour is developed and received by the director computer 20, step 244 transfers control to step 246 which adds the list of permanent items to the current items to develop a list of tray allocations that is not to be changed. Step 248 causes computer 20 to read the hourly event logs so that the director computer 20 has a list of all the cartridges required for the day. Step 250 causes the computer 20 to assign tapes to trays, and in step 252 write the final tray allocation list to a file in the file server computer 22. In step 254 the current tray allocation file and the desired tray allocation file are compared by computer 20 and a list is printed out to indicate which cartridges must be moved to correspond to the tray allocation file that had just been compiled in step 252. This tray change list is then used by station personnel to move the tape cartridges to the proper locations in the multi-tape units. Additionally, step 254 causes the computer 20 to indicate to the touch screen computer 24 that a new tray allocation file is available. After the tray change list has been printed and new tray availability indicated, control returns to step 240 for redisplay of the tray configuration menu.

If the program director has not selected the generate change list option in step 242, step 256 causes computer 20 to determine if the set permanent trays option is selected. This option allows the program director to change the list of permanent items which are used on a frequent basis and will be used for a relatively long period of time, therefore being classified as permanent. If this is the option selected, step 258 causes the computer 20 to interact with the program director to change the list of permanent items and their locations. After the permanent items list has been finalized, control returns to step 240.

If the program director has not opted to set permanent trays, step 256 passes control to step 260 which determines if the desired option is to print the list of permanent trays. If the print option is selected, step 260 passes control to step 262 and the permanent tray list is printed by the director computer 20. After the printing task is finished, control returns to step 240 for menu display.

If the program director has not decided to print the permanent tape list, control proceeds from step 260 to step 264 which determines if the empty trays option is selected. This option is used by the program director to empty all of the tray positions and essentially recreate the tray configuration data base from the beginning. Step 266 causes computer 20 to perform the emptying and clearing function if desired. After the emptying is completed, control returns to step 240 for menu display.

If the empty tray option is not selected, step 264 transfers control to step 268 which determines if the auto generate option is selected. This option allows the automatic generation of a tray change list at a given time. This option has the convenience that the program director need not be present when the tray change list is generated but can be attending to other matters as required. The station personnel then need only pick up the list generated and reposition the tape cartridges as indicated. If this is the option selected, step 268 transfers control to step 270 which receives the time at which the tray change list is to be generated. Step 272 causes computer 20 to determine if the selected time has occurred yet. If the time has not, control loops at step 272 waiting for the proper time. At the proper time, step 272 transfers control to step 274 which causes the computer to generate a new tray allocation file and produce the tray change list for station purposes. After the list has been printed, control proceeds to step 240 for menu display.

If the auto generate function has not been selected in step 268, control passes to step 262 which checks to see if the program director desires to escape back to the main menu. If not, control proceeds from step 276 to step 240 and the tray configuration menu is redisplayed. If the program director has opted to escape, step 276 transfers control to step 204 and the main menu is redisplayed.

If the program director has not chosen the tray configuration function, step 238 passes control to step 278 which causes computer 20 to determine if the program director has selected the extra event function. This function allows the program director to insert an event in the log that is already present in the touch screen computer 24. If the particular hourly log has not yet been called up by the touch screen computer 24 the changes are made using normal log edit procedures, but this cannot be done if the hourly log is already present in the touch screen computer 24 because the touch screen computer 24 only reads in each hours log once. If this option is selected, control proceeds from step 278 to step 280 and the extra event menu is displayed. The program director makes his choice of the available options of editing existing events, adding an event, sending an event or quitting the extra event function.

The computer 20 then determines whether the program director has elected to edit an existing record in step 282. If so, control proceeds from step 282 to step 284 where the existing event or events are selected and edited by the program director. Thereafter, control returns to step 280 for menu display.

If the program director has not opted to edit an existing event, control proceeds from step 282 to step 286 where the computer 20 determines whether the program director has decided to add an event. If an event is to be added, control proceeds from step 286 to step 288 and the new event is created by the program director and added to the list of extra events. Thereafter, control returns to step 280 for menu display.

If the program director does not wish to edit an event, step 286 transfers control to step 290 which determines if the program director is finished editing all events and desires to send the extra events to the touch screen. If so, step 290 transfers control to step 292 which causes computer 20 to send the extra events to the touch screen computer 24 via the file server computer 22. This is done by setting a value in the memory of the file server computer 22, the existence of which is periodically scanned by the touch screen computer 24. If this value exists, touch screen computer 24 retrieves the events as described in the LOOKXTRA sequence 850.

If the program director does not wish to send the events, step 290 transfers control to step 294 which determines if the program director desires to quit the extra event function. If not, control is returned to step 280 for menu redisplay. If he does desire to quit, step 294 transfers control to step 204 for main menu redisplay.

If the program director does not desire to perform the extra event function, step 278 transfers control to step 296 which determines if the program director or editor wishes to perform the create copy function. The create copy function is used to delete copy that exists, edit existing copy or create new copy. The copy must be correct since it appears on the touch screen computer 24 display and is read by the announcer and broadcast over the air. Displaying the copy directly on the touch screen computer display, eliminates the need for any paper copy and greatly reduces the possibilities of reading the wrong copy at the wrong time or losing needed copy.

If the create copy function is desired, step 296 transfers control to step 298. In step 298 the computer 20 inquires whether the program director desires to delete the old copy that exists in the system. If so, step 298 transfers control to step 300 which deletes all the copy that is greater than 24 hours old and was not marked as permanent copy. If the program director does not wish to delete old copy, step 298 transfers control to step 302 which is also where control would proceed after the completion of step 300. Step 302 causes the computer 20 to query the program director to see if he would like to delete the permanent copy that exists on the system. If so, step 302 transfers control to step 304 which allows the program director to delete selected permanent copy. If the program director does not wish to delete permanent copy, step 302 transfers control to step 306 which is also where control would proceed after step 304.

Step 306 causes computer 20 to display the copy resident in the system. Step 308 then allows the program director to select and edit the desired copy and to add new copy. After the editing in step 308 is completed, step 310 causes the computer 20 to store the edited copy in the file server computer 22 and control is returned to step 204 for main menu display.

If in step 296 computer 20 determines that the program director does not wish to enter the create copy function, control proceeds to step 312 where the computer determines if the send message function is desired. The send message function is used by the program director to send a message from the program director's console directly to the touch screen computer 24, allowing the program director to send messages to the announcer. If this is the desired function, step 312 transfers control to step 314 where computer 20 receives the message desired to be sent by the program director and any acknowledgement requirement. After receiving the message, step 314 transfers control to step 316 and the message is sent to the touch screen computer 24. After the message is sent, step 316 transfers control to step 318.

The program director has the option of requesting that the announcer acknowledge the receipt of a message. If a reply is not desired, control is passed from step 318 to step 304 for main menu display. If a reply is desired, step 318 transfers control to step 320. Step 320 causes computer 20 to determine if the message has been acknowledged. If so, step 320 passes control to step 322 which causes computer 20 to provide an acknowledgement signal to the program director and control proceeds to step 328.

If the message has not been acknowledged in step 320, control proceeds to step 324 to determine whether the acknowledgement time has been expired. The announcer has approximately two minutes to acknowledge the message or non-acknowledgment will be indicated. If the time for acknowledgment has not expired, control is passed to step 320 which causes another inquiry to determine whether the message has been acknowledged. If the acknowledgment time has expired, control is passed to step 326 which provides a non-acknowledgement signal to the program director. Step 326 passes control to step 328 which determines whether the program director would like to send another message. If so, step 328 transfers control to step 314. If not, control is returned to step 204 for main menu display.

If at step 312 it was determined that the program director did not want to send a message, control proceeds to step 330 which causes the computer 20 to determine whether the program director wishes to capture a new daily log. The capture log function is used to capture the daily log from the billing computer 26 so that the previously scheduled events need not be re-entered. If the capture log function is selected, step 330 transfers control to step 332 which places the director computer 20 into a capture mode to automatically capture data from the billing computer 26. After the daily log has been fully captured, step 332 transfers control to step 334, where the daily log is split into hourly segment files. By splitting the log into hourly events the touch screen computer 24 need only be able to deal with events on a one hour or at most two hour basis, thereby also allowing the program director to make changes to the log several hours in advance without having to use the extra function. Additionally this breaking up into hourly files greatly reduces the file length needed to be manipulated by the program director in his various editing functions, easing memory requirements and increasing speed. After the daily log has been split into hourly segment files, step 334 transfers control to step 204 for main menu display.

If the program director has not chosen to capture the log in step 330, control is transferred to step 336 where the computer 20 determines if the program director desires to print the output log which has been generated by the touch screen computer 24 and stored in the file server computer 22. This is a complete, accurate log of the events that were actually broadcast over the air, along with all the associated information needed to properly maintain the log. If this option is selected, control is transferred to step 338 which causes the output log for the day requested by the program director to be printed. Control is then transferred to step 340 which determines whether the program director wishes to delete old portions of the log. If not, step 340 transfers control to step 204. If he does wish to delete old portions of the log, step 342 causes the items that are to be deleted to be printed for archival purposes and the old log portions are deleted at step 344. Control is then transferred to step 204 for main menu redisplay.

If the program director has not requested the output log printout in step 336, control passes to step 346 where the computer 22 inquires whether the program director has requested use of the system utilities. If so, 346 transfers control to step 348 which displays the utilities menu. The available utilities are date and time set and change the number of trays or multi-tape units available. After the program director indicates his utilities choice, step 350 causes computer 20 to determine if the option desired is to change the quantity of the trays that exist. This option allows the program director to change the number of tray cartridges available in a given multi-tape unit or the total number of trays available. If this option is selected, step 350 transfers control to step 352 which interacts with the program director to change the quantity of multi-tape units or trays that exist in a given multi-tape unit. After these quantities have been changed, step 352 transfers control to step 348 for utility menu redisplay.

If the program director has chosen not to change the tray quantities in step 350, control proceeds to step 354 to determine if the program director wishes to set the overall system time. If not, step 354 transfers control to step 204. If he does wish to set the system time, control proceeds from step 354 to step 356 where the program director indicates the system date and time, which is thereafter used by all of the other computers in the system S. Control then proceeds from step 356 to step 204 for main menu redisplay.

If the program director has chosen not to perform the system utilities function in step 346, control proceeds to step

358. Step 358 determines if the program director wishes to escape from this program completely and return the director computer 20 back to a resident operating system. If not, control proceeds from step 358 to step 204 for main menu redisplay and continues in the loop. If the program director does wish to escape the producer sequence 200, step 358 transfers control to step 360 to exit the producer sequence 200 and return to the operating system resident in the director computer 20.

C. Touch Screen Station

The touch screen computer software controls the touch screen computer 24, the source devices and the analog switcher/mixer 70 in addition to communications with the file server computer 22 and interfacing with the touch screen. This software is a real time, multitasking package. Unlike the director computer 20 which can readily be used to run other standard computer programs besides the producer sequence 200, the touch screen computer 24 is essentially dedicated to running the touch screen software. This is because the computer 24 performs the real time control that is required to maintain the station events as needed and running other programs would interfere with the control. The touch screen computer software is segmented into a number of independent modules or routines which are executed as necessary. These routines will be discussed individually with reference to other modules as necessary.

1. Initialization

Figure 3:
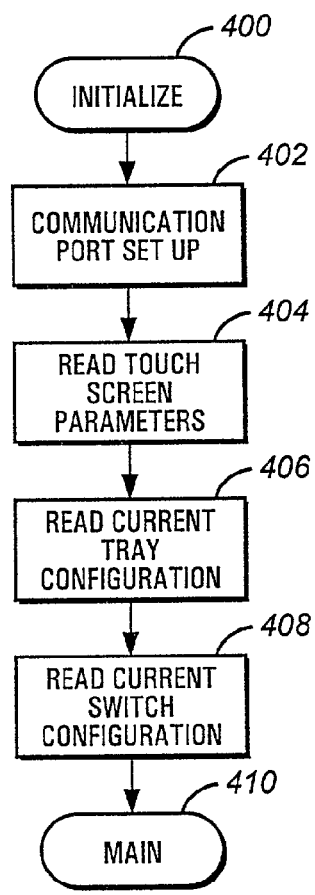
Figure 4A:
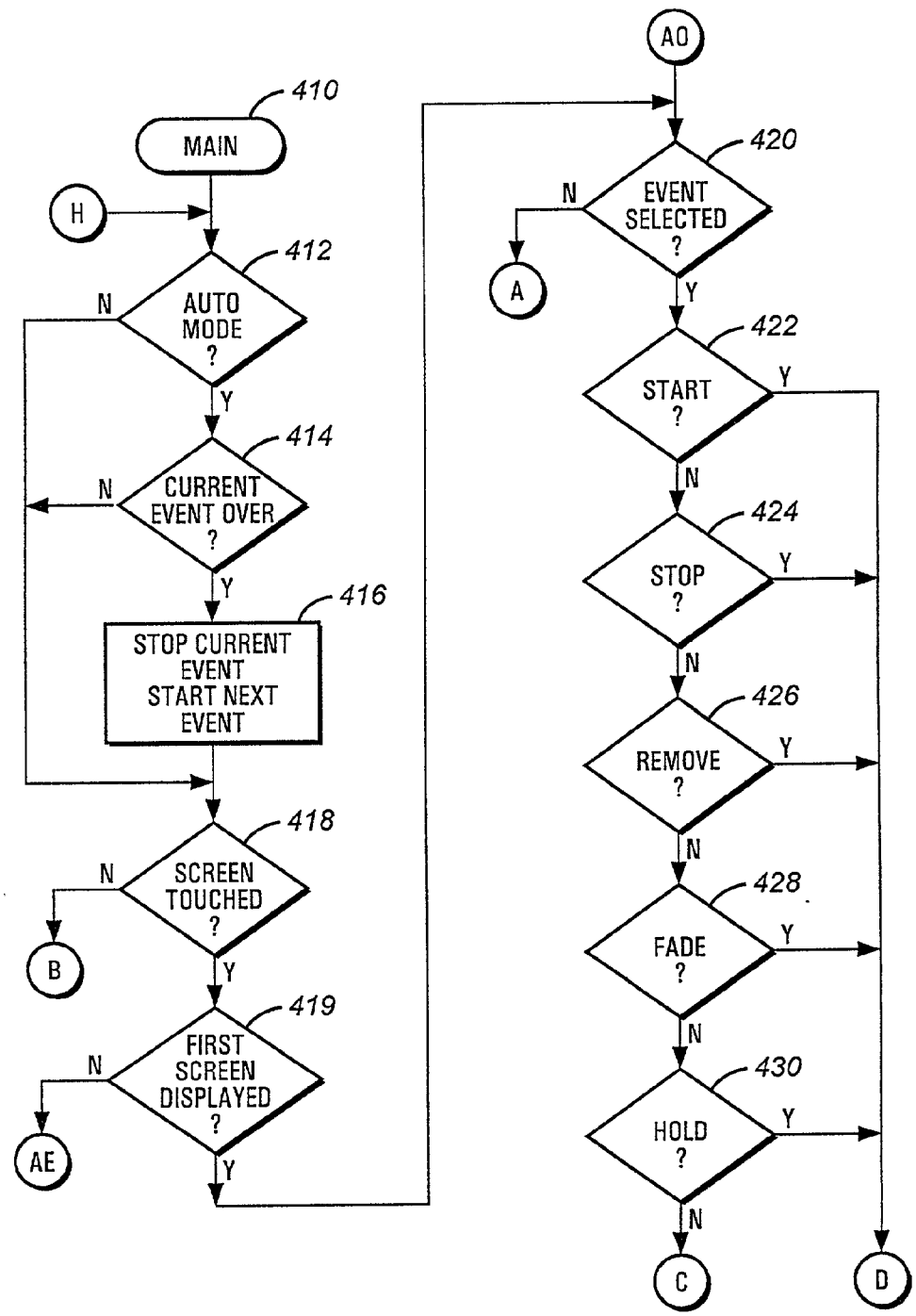
Figure 4B:
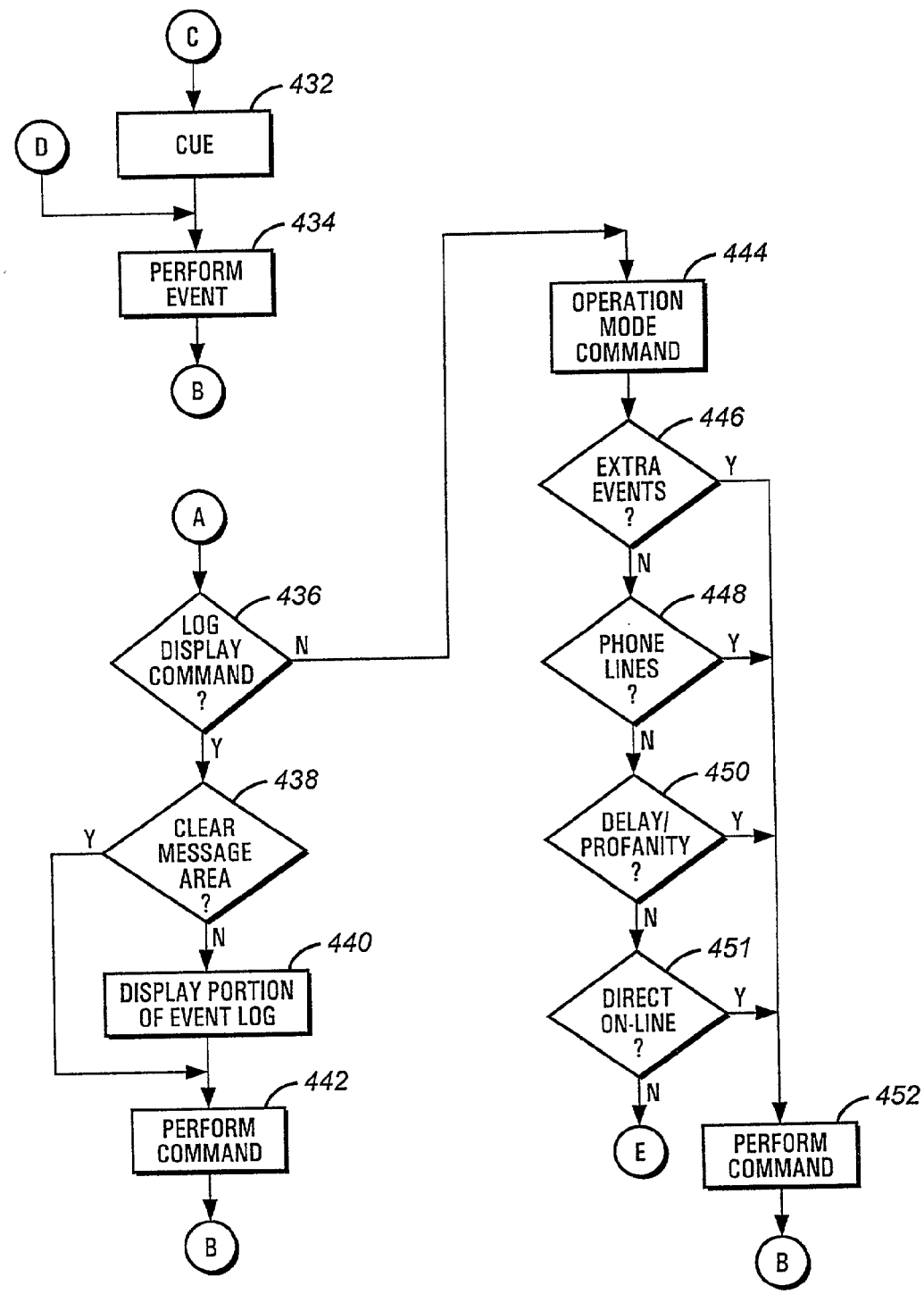
Figure 4C:
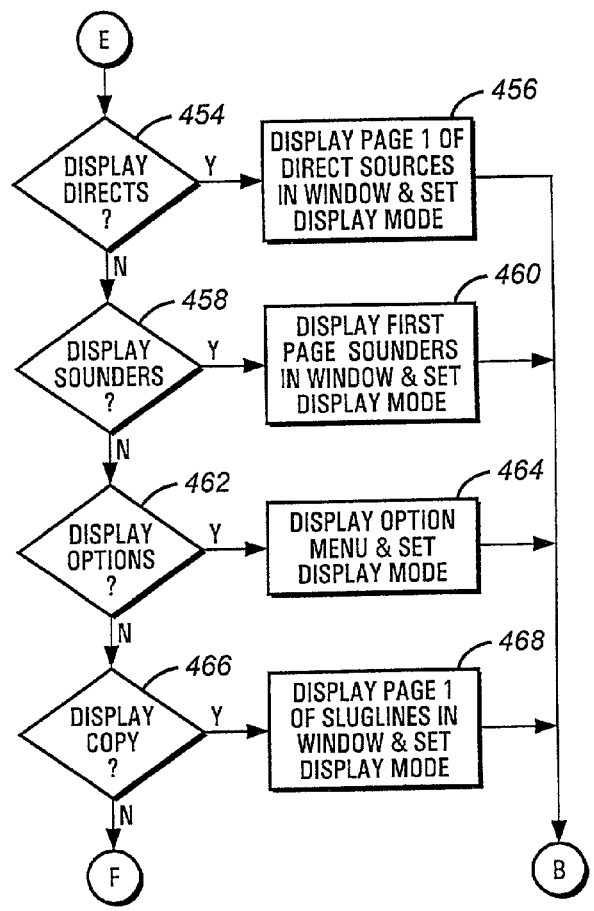
Figure 4D:
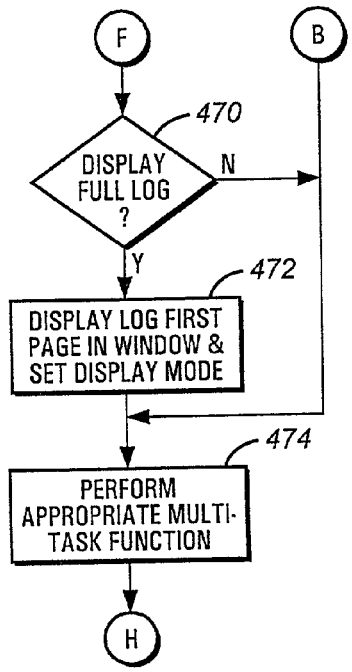
Figure 4E:
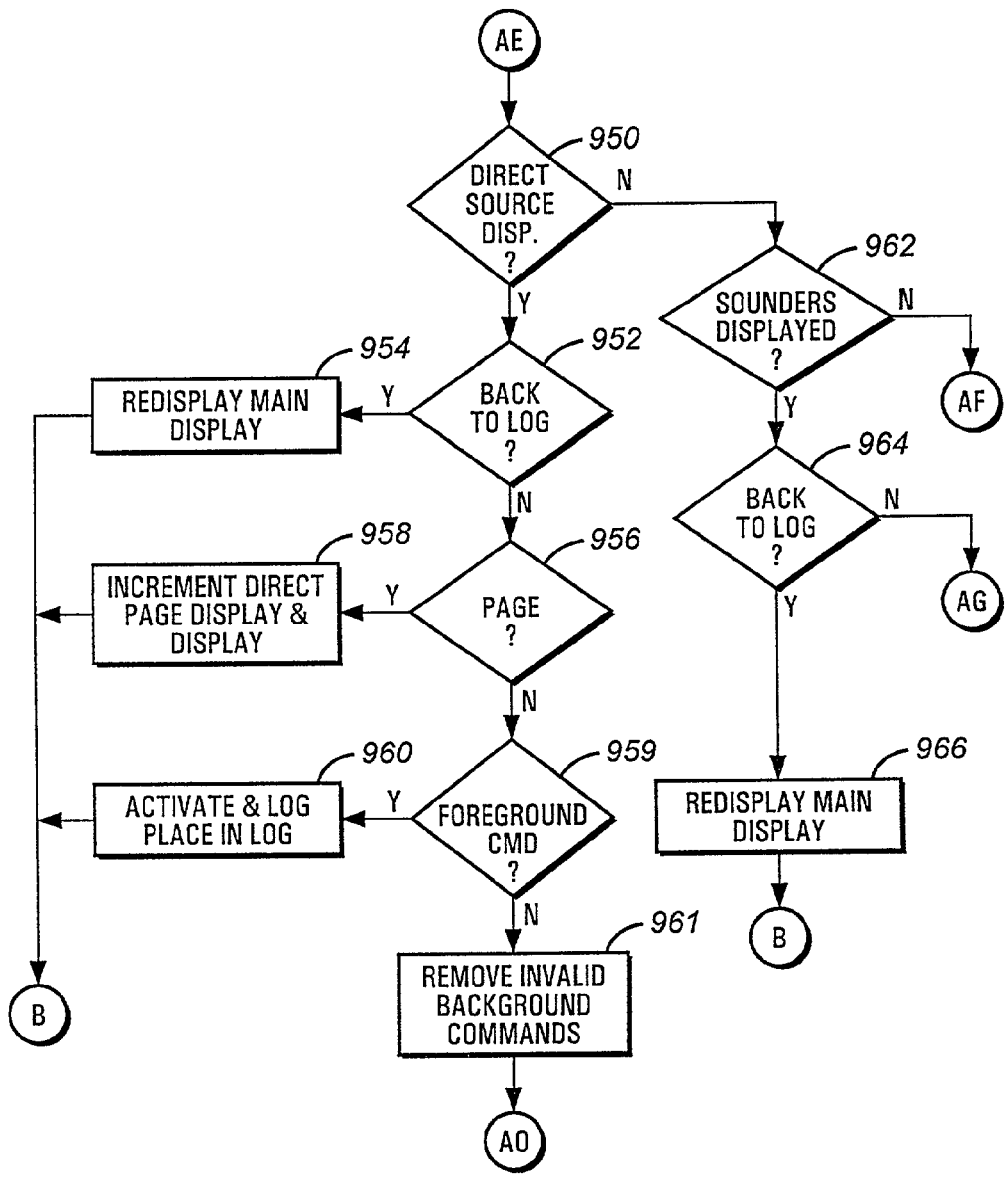
Figure 4F:
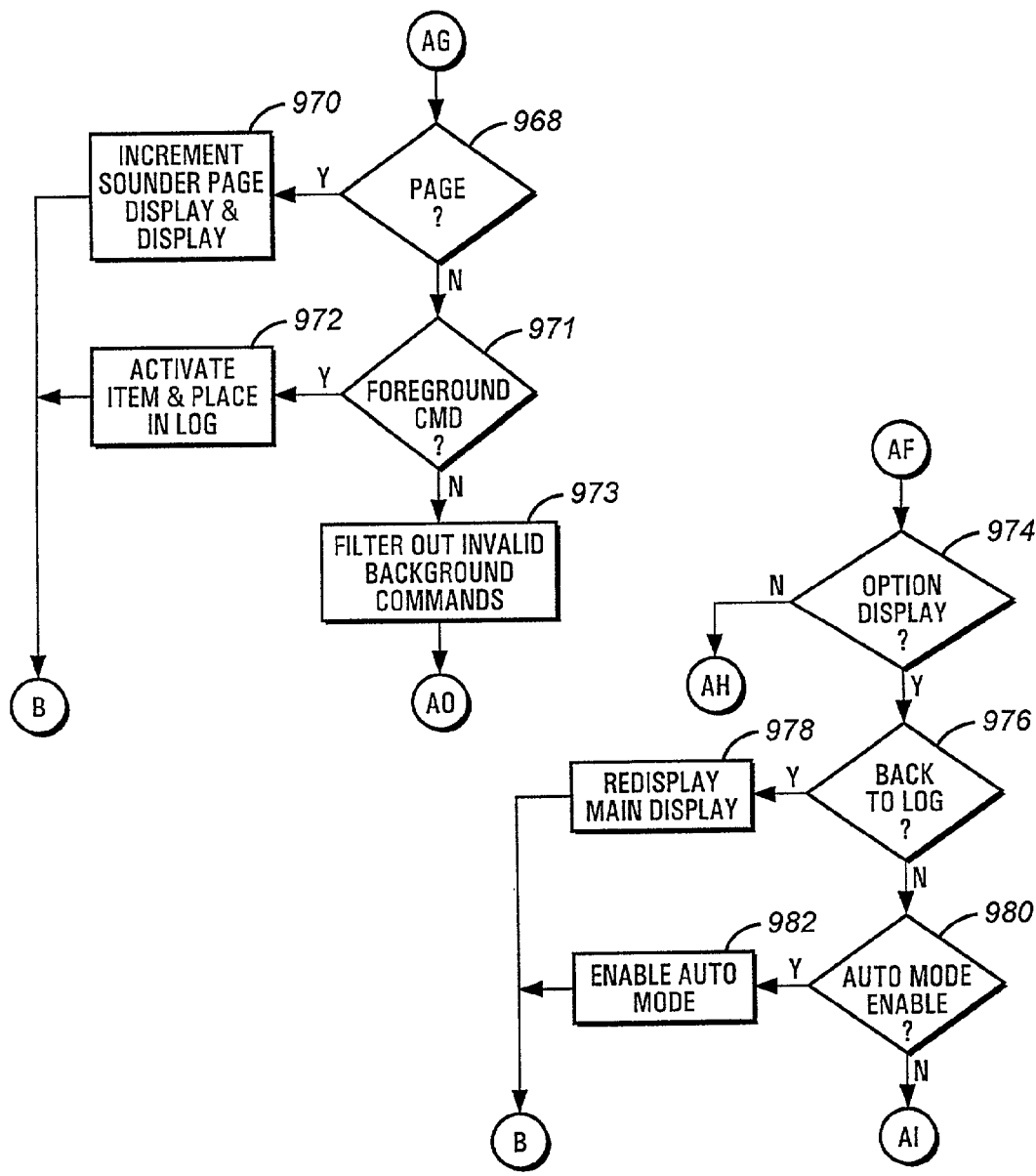
Figure 4G:
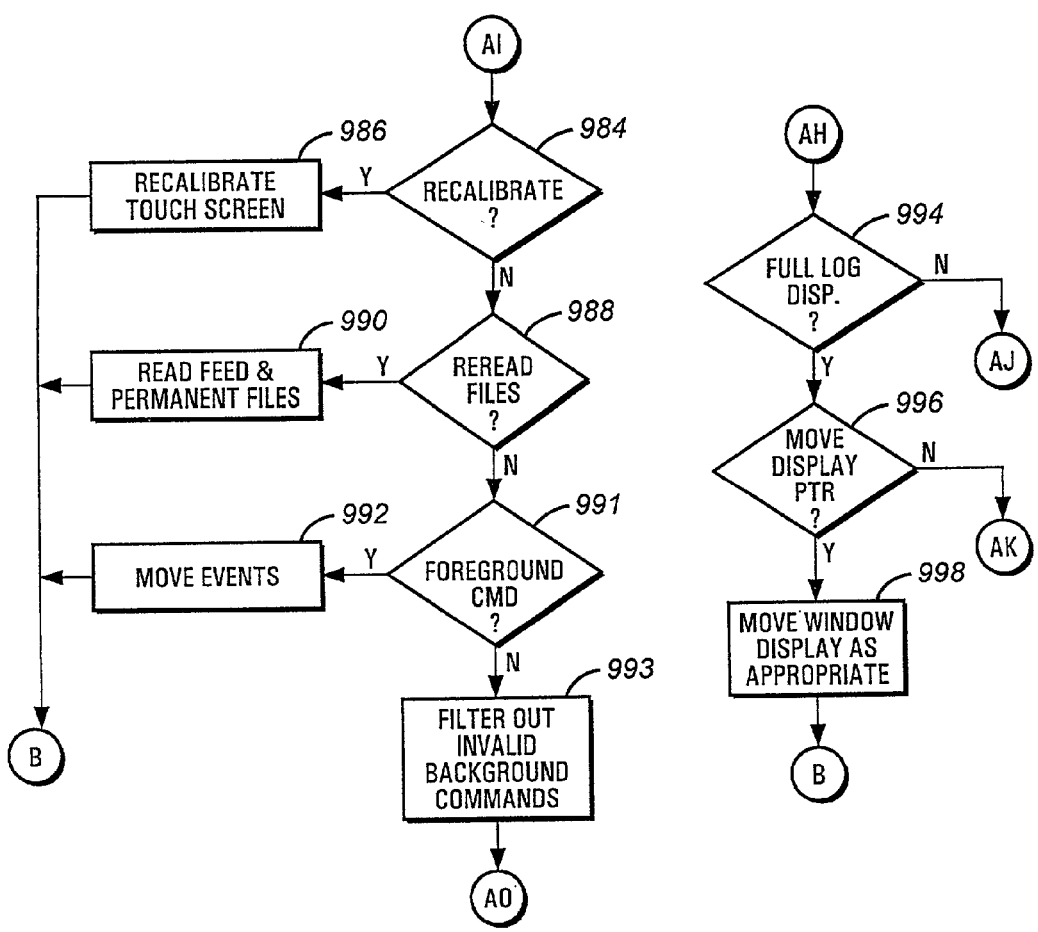
Figure 4H:
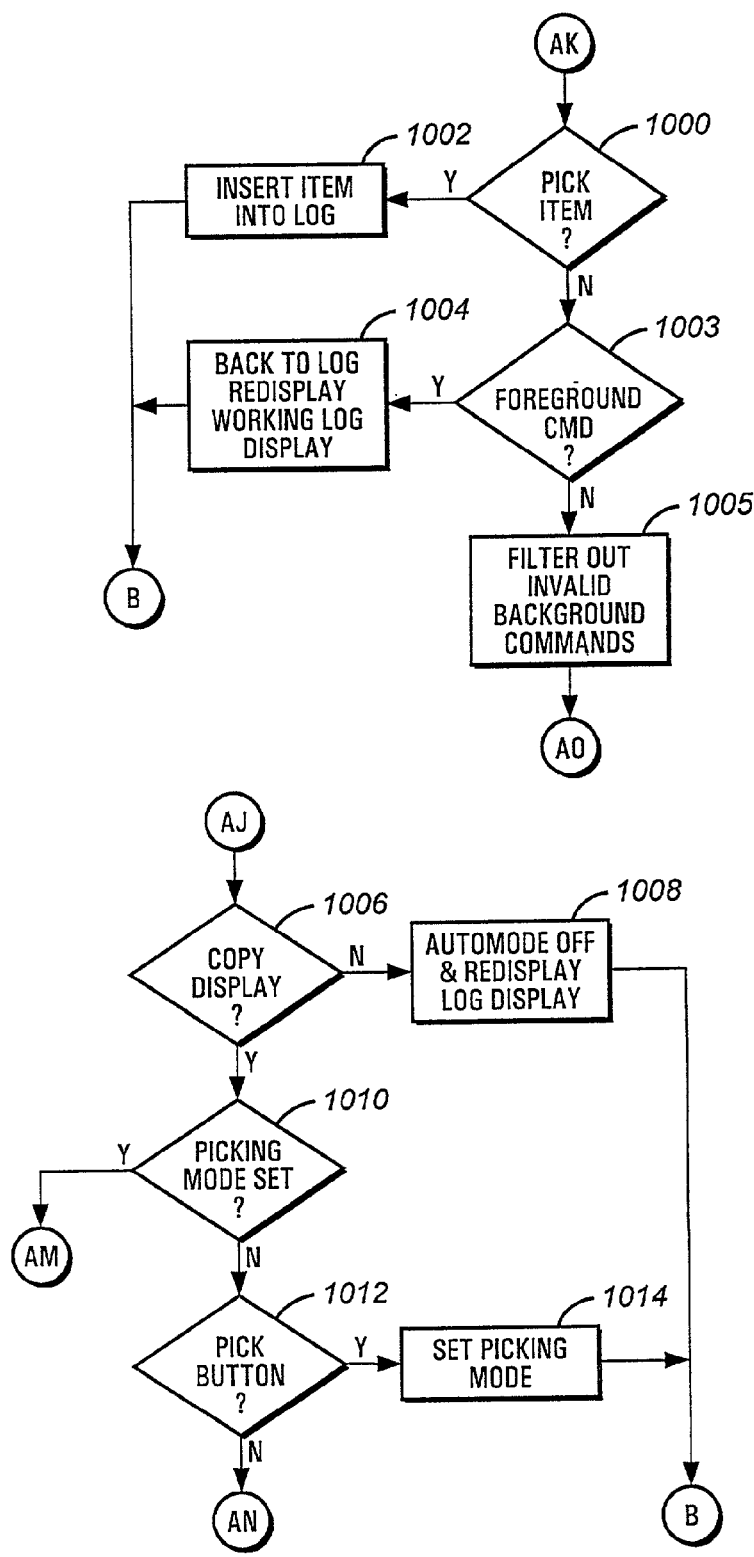
Figure 4I:
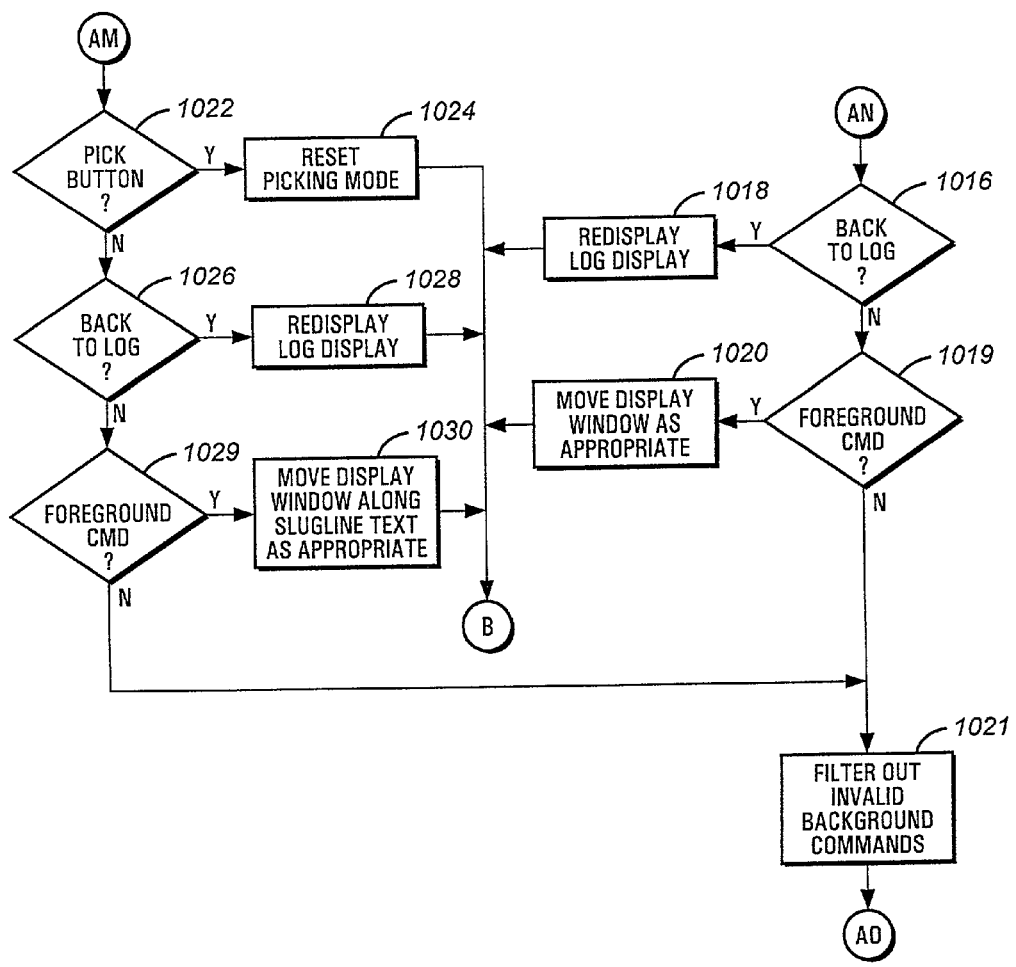

The initializes sequence 400 (FIG. 3) is executed when the touch screen computer 24 is initially activated or reset. Sequence 400 is used to initialize the computer 24. Sequence 400 begins executing at step 402 which initializes the communications ports with the file server computer 22, the local printer 40 and the output controlled devices such as the digital switch circuitry 42, the intelligent sources and the switcher/mixer 70. Thereafter, computer 24 reads the touch screen parameters needed to properly interpret the touch screen signals in step 404. Step 406 then causes computer 24 to read the current tray configuration file from the file server computer 22 to show which trays are in which location for the given hour. After reading the tray configuration in step 406, step 408 reads the current switch configurations so that the touch screen computer 24 has the proper translation data base to activate the prescribed source at the right time as indicated by the log events. After reading the switch configuration in step 408, control is passed to sequence 410, the main program sequence.

2. Main Program Sequence

The main program sequence 410 is the main controlling routine for the touch screen computer 24. The sequence 410 causes computer 24 to schedule the required events, activate the scheduled events, and determine if the announcer has requested various functions and whether the director computer 20 has requested certain functions or options.

Main sequence 410 begins execution at step 412 which determines if the touch screen computer 24 is operating in the automatic mode. In the automatic mode the log is aired as scheduled without revision or alteration. In this mode, all the tapes must be in the correct locations and no unusual events can occur. If the system is in the auto mode, step 412 transfers control to step 414 which determines if the current event is over. If the system is not in the auto mode or if the current event is not over, steps 412 and 414 respectively transfer control to step 418. If the current event is over, step 414 transfers control to step 416 which stops the current event and starts the next event in the log for broadcast on the air. After starting the event, step 416 transfers control to step 418.

Step 418 determines whether the touch screen has been touched by the announcer. If not, control proceeds to step 474. If the touch screen has been touched, control proceeds to step 419 where the computer 24 determines if the first screen, the working log screen 1298 (FIG. 13), is displayed. If the first screen is displayed, control passes to step 420 where the computer 24 determines if an event or event operation has been selected. If an event operation is started, steps 422–432 determine which of the event operations has been selected. An event is activated by pushing the START button displayed in the status column 1302 on the touch screen. This changes the event from the off status to the on status, activates the event and starts the active item timer which is shown below the word ON. Anytime the touch screen is pressed a diamond momentarily appears at the position touched. Additionally, any time a representation of a button on the display is touched the button changes color to provide feedback to the announcer.

An event is stopped after it has been turned on by pushing either the ON button or the appropriate KILL location 304. A three second delay is provided when an event is activated to prevent the event from being cancelled within that period. This delay is controlled in the TIMER sequence 600. Normally an active event goes to a completed or done condition after it has been aired and is cancelled using the ON button, but the kill option allows premature termination. The distinction between the buttons appears in the printed log which shows which button was used, KILL meaning the event did not complete normally and OFF, which results from pressing the ON button, meaning normal completion.

An inactive event can be removed from the displayed area by touching the MOVE button 1306, which allows a skip of a proposed event.

A given event can also be faded by the amount of fade set in the switcher/mixer 70 by touching the FADE position 1308, which is the event legend block. If the switcher/mixer 70 is appropriately designed and configured, a variable fade can be accomplished by touching the event title at a desired distance from one end, with the distance being proportional to the amount of fade desired. The computer 24 recognizes the distance and relays the fade information to the switcher/mixer 70. By proper fading it is possible to have two events airing at the same time, one faded, one at standard volume with the two mixed together. An example of this would be a ticker tape sound faded while a stock market report is being read.

An active event can be placed in a hold condition by the HOLD button 1310. The HOLD feature is used to save a scheduled log entry when an event is scheduled to start, be interrupted by a commercial or other interruption and resume again after the interruption. The event is started, placed on hold, an entry is placed in the output log, the event remains on the screen and the next event airs. When the commercial is finished and stopped, hitting the HOLD button 1310 again immediately restarts the held event. Therefore, one less scheduled log entry is needed but the printed log is accurate.

Finally, an event can be cued or directed to the studio monitors by touching the CUE position 1312 on that given event line. Events can be cued only when inactive, because when the event is activated the CUE button 1312 becomes the HOLD button 1310. Cueing an event directs the touch screen computer 24 to activate the event and configure switcher 70 so that the output from that device is directed to the monitor bus for broadcast over the station monitors 78. Touching the CUE button 1312 a second time stops the cued event.

After determining the appropriate event option selected in steps 422–432, the event is performed in step 434. Thereafter control is passed to step 474.

It is to be noted that all events activated are actually being mixed and transmitted to the desired output source. Therefore it is possible to mix and air from as many different sources as required. The output source for each active event is included in the information for that event by the program director during scheduled log development. The announcer can cue events for play on the monitor bus as indicated above, but cannot change the desired output for any active event.

Figure 13:
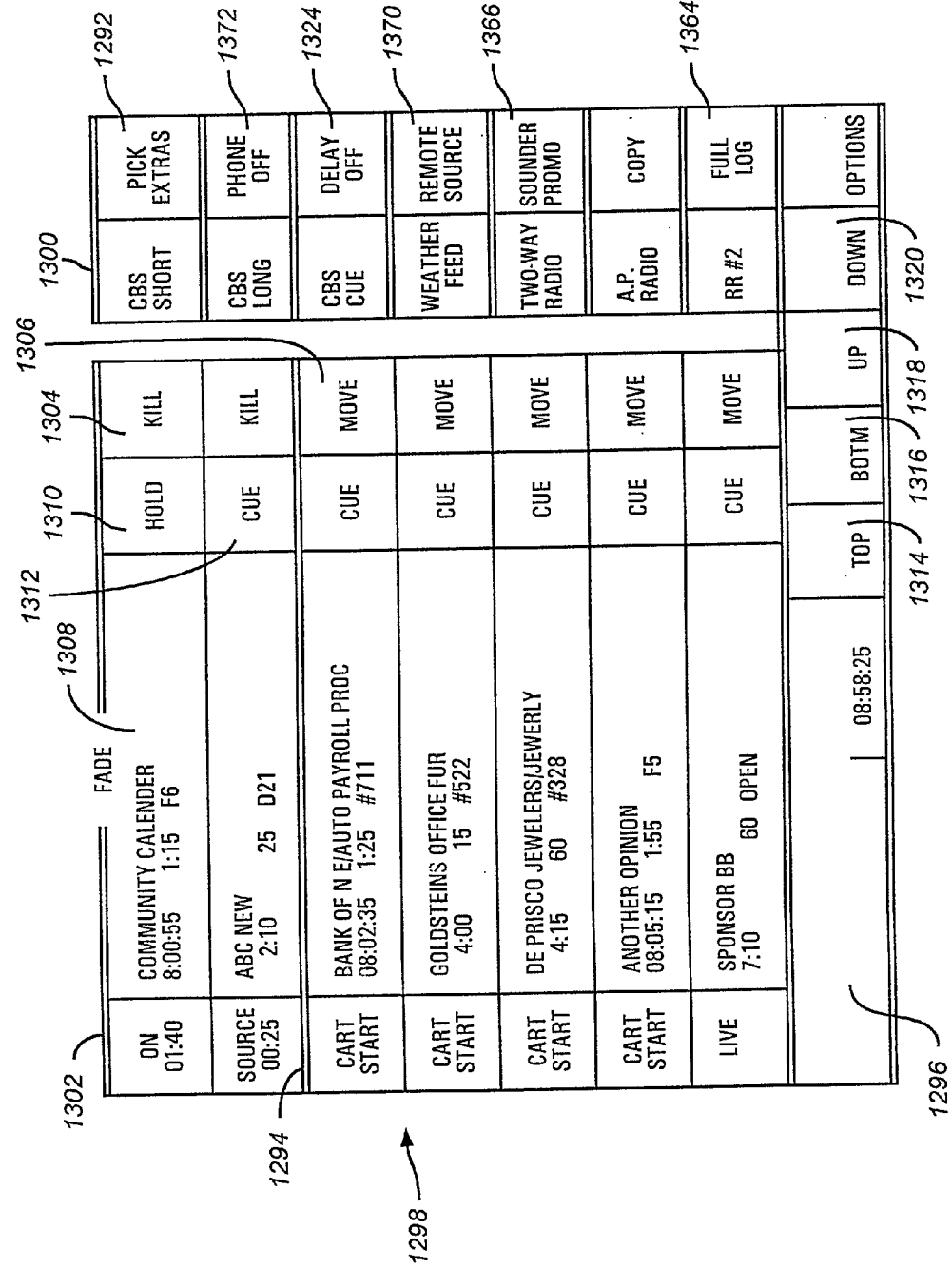

If an event option is not selected in step 420, control is transferred to step 436 which determines if an event log screen display command is selected. These are essentially the top, bottom, up and down buttons 1314–1320 as shown in FIG. 13 which control the events displayed on the log screen display. As illustrated, the display shows the status of each event whether it is active or inactive as shown by the on and off display, the length of time the event has been in the active mode, a brief description of the event, the running time of the event and the originally scheduled air time of the event. The events displayed are a portion of the entire log contained in the touch screen computer 24, with the display being a moveable window showing only a portion of the log. The active and inactive events are separated by a boundary 1294 to further indicate the separation. The log screen display movement commands affect only the inactive events. All of the active events remain at the top of the working log display for easy reference.

If the log display command is chosen, step 436 transfers control to step 438. If the announcer touched the message area 1296 shown in the lower left-hand corner to acknowledge a message received from the program director, step 438 transfers control to step 442 which in this case clears the message area 1296 and acknowledges that the message was received. If the option selected in the log display command is not to clear the message area 1296 or acknowledge the message, step 438 transfers control to step 440 which determines the desired action of the log display window. The command to move the window up, down, to the top or to the bottom of the event log as determined by step 440 is performed in step 442. After performing step 442, control is transferred to step 474.

If a log display command is not indicated in step 436, this only leaves an operation mode command as indicated in step 444. The operation mode commands are essentially those buttons or positions shown in the two right-most columns in FIG. 13. Steps 446 to 451 determine if the command is one of the simple commands.

Step 446 ascertains whether the announcer has picked an extra event sent by the program director so that the extra event can be aired. If so, the last extra event received is moved into the next position scheduled to be aired.

Step 448 determines if the announcer wishes to activate the phone line source 52 to accept and broadcast incoming calls. Control is then transferred to step 450 which determines if the delay for profanity position 1324 has been pressed. Touching button 1324 momentarily mutes the source to eliminate the profanity. Control is then transferred to step 451.

Step 451 ascertains whether the announcer wishes to immediately activate one of the direct sources shown in the direct on-line column 1300. The sources displayed in column 1300 are those remote sources which are often used or needed quickly. These sources are also included in the remote source selection option. If the announcer has requested one of the sounds in column 1300, step 451 causes appropriate source to be entered into the log and immediately activated.

The appropriate command selected by steps 446–451 is performed in step 452 and then control is thereafter transferred to step 474.

If none of these direct-source commands has been requested, step 451 transfers control to step 454 where the computer 24 determines whether the announcer has indicated a desire to display the direct and remote sources. If so, control is transferred to step 456 which displays the first page of the remote source list in a window overlaying the log screen as shown in FIG. 14 and sets the display mode to indicate that the touch screen computer 24 is displaying the direct menu 1324. Step 456 then passes control to step 474.

Figure 15:
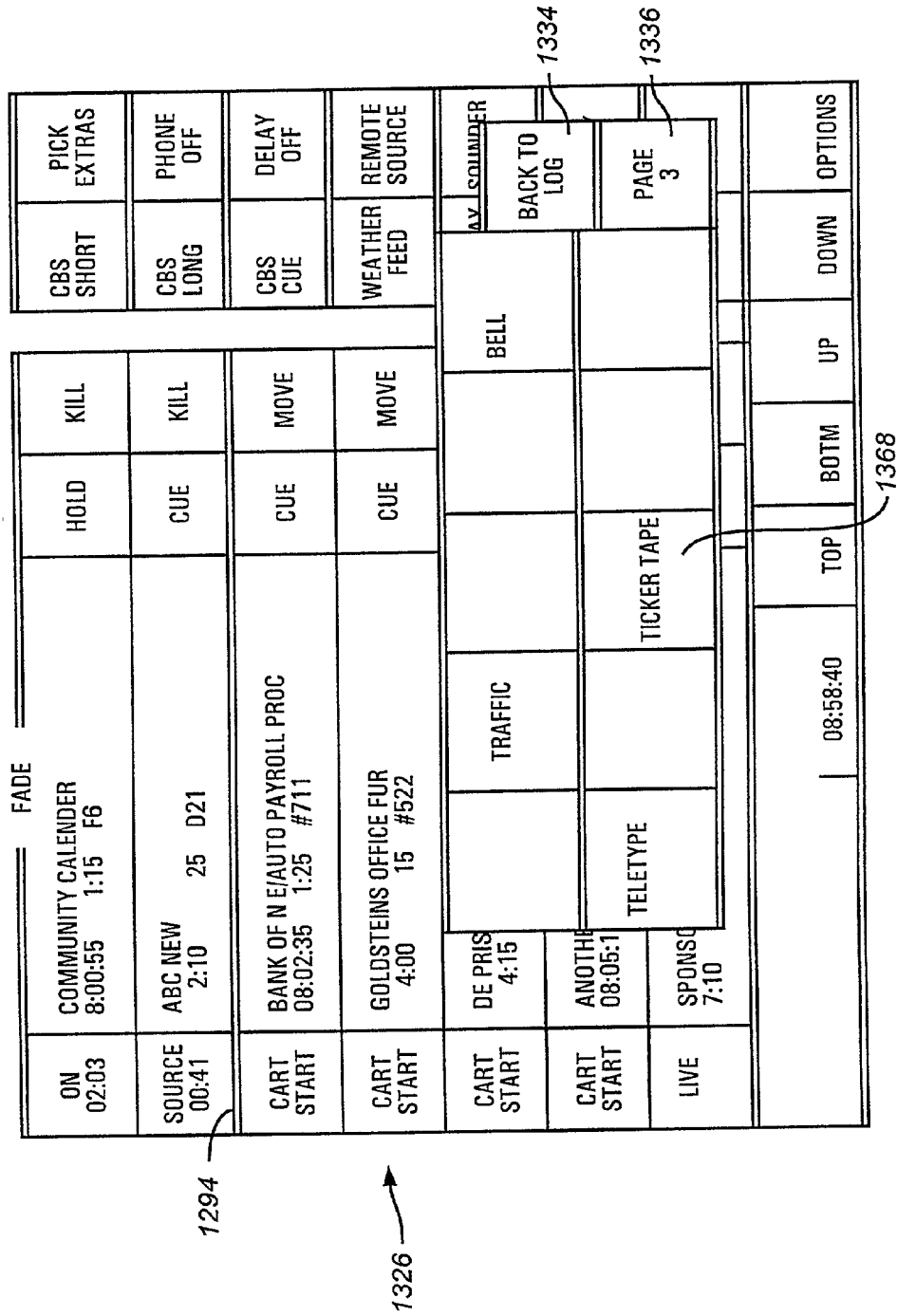

If the announcer does not wish to display the direct and remote sources display 1324, control is transferred from step 454 to step 458 which determines if the announcer wishes to display the available sounders. If so, step 460 displays the first page of available sounders in a window on the log screen as shown in FIG. 15 and sets the display mode to indicate that the sounder display 1326 is active. After setting the display mode, control is transferred to step 474.

Figure 16:
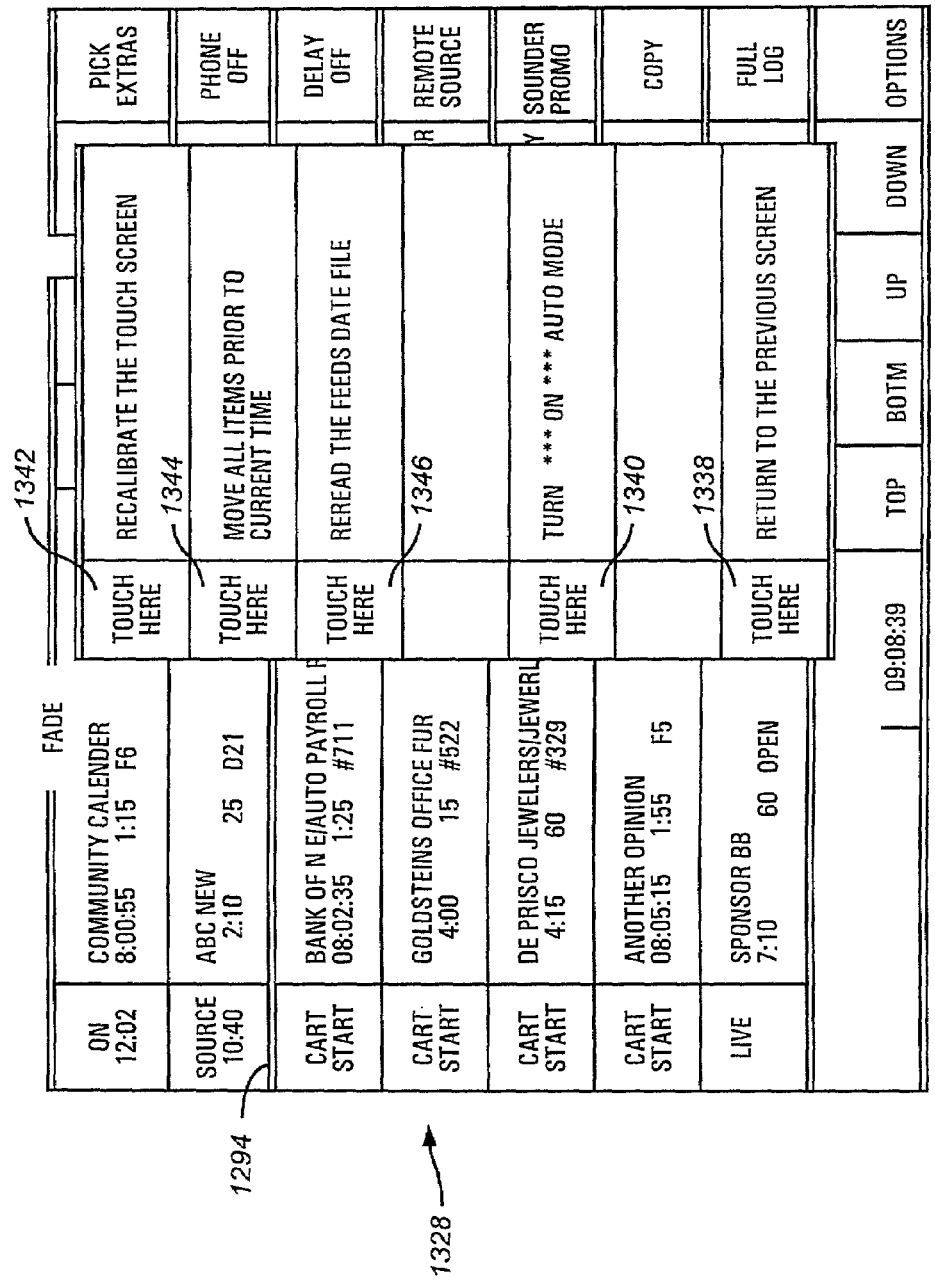

If the announcer does not wish to display the sounders 1326, control transfers from step 458 to step 462. If the announcer wishes to display the available options, step 462 transfers control to step 464 which displays the option menu as shown in FIG. 16 and sets the display mode to indicate the display of the option menu 1328. After setting the display mode, control transferred to step 474.

If the announcer does not wish to display the option menu 1328, control transfers from step 462 to step 466 where the computer 24 determines if the announcer has selected the display copy function. If so, control transfers to step 468 which causes the first page of the available slug lines to be displayed in a window on the log screen and sets the display mode to indicate copy display active. A slug line is the label used to indicate the title or other short form abbreviation used to indicate copy to be read over the air. After setting the display mode in step 468, control passes to step 474.

Figure 17:
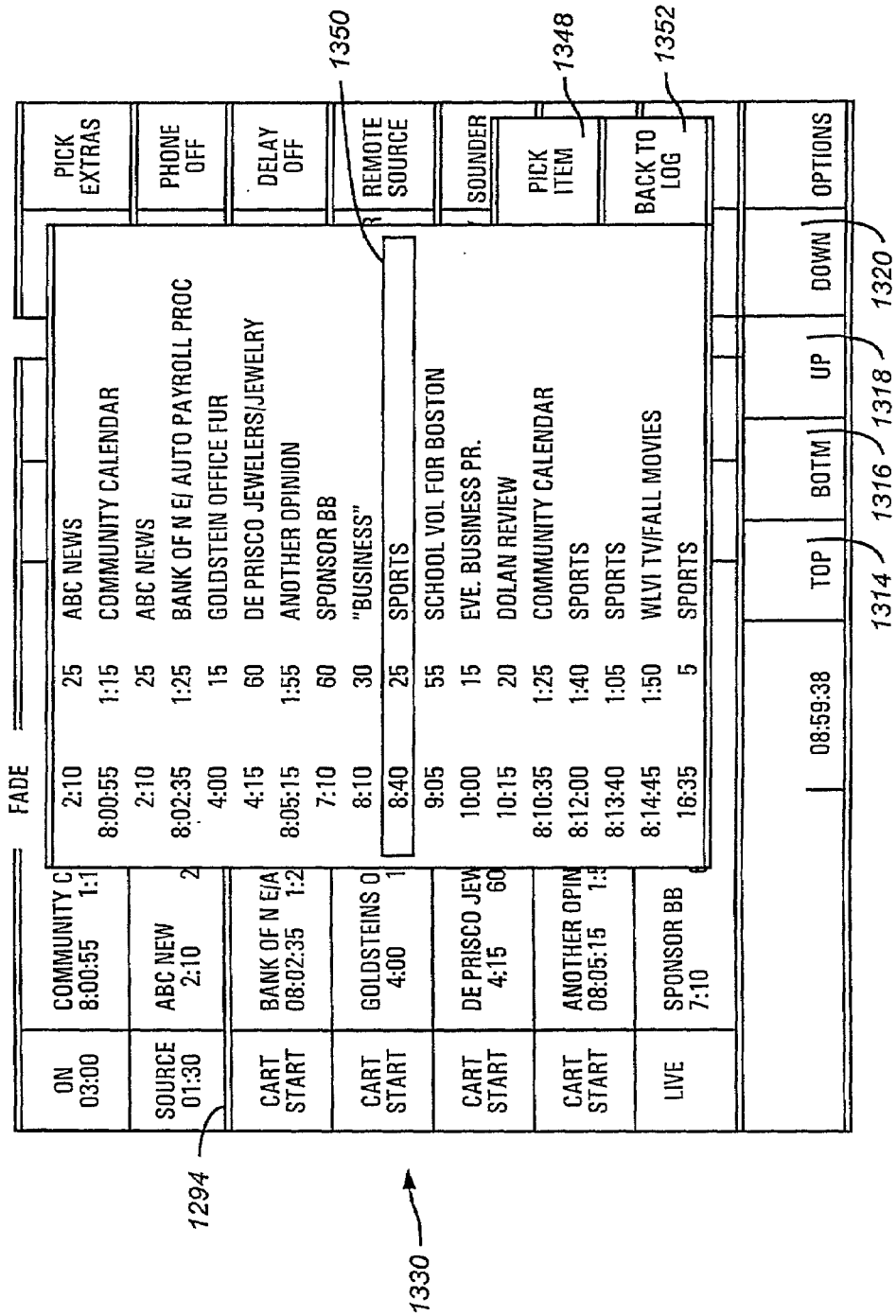

If the announcer does not wish to display copy in step 466, control transfers to step 470 where the computer 24 determines if the announcer desires to display the full log. If so, step 472 causes the first page of the full log to be displayed in a window over the log display and sets the display mode to indicate full log display 1330 as shown in FIG. 17. After step 472 is completed or if the announcer did not wish to display the full log in step 470, control transferred to step 474.

Step 474 cause computer 24 to perform the appropriate multi-task function. There are three general groups of multi-task functions. The first group is the TIMER sequence 600 which updates all the times on the screen. The second group is the screen update function which updates the working log display as events finish and scrolling is required. The third group is the multi-tasking file handler which handles the file tasks and communicates with the file server computer 22.

The tasks performed by the multi-task function have been segmented into small components that can be executed in short time intervals and therefore appear transparent to the announcer and to avoid missing an event change at the proper time. Therefore, by design, each single task performed by the multi-tasking function takes less than one second to complete, thereby allowing the computer 24 to take other prescribed actions at the appropriate time. None of the tasks required in the multi-tasking function that could require extended periods of time are as critical as the proper event function timing and are therefore assigned lesser priority.

Furthermore, computer 24 executes these multi-tasking functions so quickly that the multi-tasking functions appear to be almost continuous to the announcer.

The multi-tasking function determines the priority of the various functions that are to be performed and the various subfunctions to be performed. This priority is handled by a combination of the functions and subfunctions themselves and by the order in which the functions and subfunctions are performed. The way the scheduling is done will become more apparent in the discussion of the various functions and subfunctions.

If the first screen is determined as not being displayed in step 419, control transfers to step 950. This indicates that one of the special function menus is being displayed as a window over the working log display.

In step 950 the computer 24 determines whether the direct sources menu 1324 is displayed. If so, control transfers to step 952 which determines if the back to log button 1322 shown in FIG. 14 has been pressed. If so, step 952 transfers control to step 954 which causes the main working log 1248 to be displayed and transfers control to step 474.

If the back to log button 1322 has not been pressed, step 952 transfers control to step 956 which ascertains whether the page button 1332 has been pressed, and if so, transfers control to step 958. Step 958 causes the direct page display to be incremented and the next page to be displayed in the list of direct and remote sources available. After displaying the next page of direct sources available, control transfers to step 474.

If the page button 1332 was not touched as determined in step 956, control transfers to step 959 which determines if the location touched is a foreground location. The foreground locations are those associated with the active window. The window and its buttons are treated as a foreground level, while the remaining portions of the screen are treated as a background level when a window is being displayed. If step 959 determined that a foreground area not previously processed has been touched, control proceeds to step 960. In this instance the foreground area not previously processed is the area containing the various available direct sources, so a touch indicates selection of the desired direct source which step 960 activates and places in the log and transfers control to step 474.

If step 959 determined that a foreground command had not been entered, control proceeds to step 961 which removes any invalid background commands before passing control to step 420. Invalid background commands are those which would cause a second window or overlay or those commands whose buttons are not fully visible behind the foreground window. The various windows are designed so that the ON and START buttons for the events displayed on the working log are always available so that the announcer does not have to return from a window to activate or deactivate events in the working log. Additionally, the windows are designed so that the PICK EXTRAS button 1292, the PHONE button 1372 and the DELAY button 1324 are always available.

By using the direct source menu 1324 the announcer is able to select from a number of direct sources such as satellite feeds 68, telephone lines 52 and microphones 48.

If the direct sources display 1324 is not active, step 950 transfers control to step 962 which causes computer 24 to determine if the sounders menu 1326 is being displayed. If so, control transfers to step 964 which determines if the back to log 1334 button has been touched. If so, step 964 transfers control to step 966 which redisplays the main working log display 1298 and transfers control to step 474.

If the back to log button 1334 has not been touched, step 964 transfers control to step 968 which causes computer 24 to determine if the page button 1336 has been touched. The sounders page button 1336 operates in the same manner as the direct sources display page button 1332 in that repetitive touching of the button pages the announcer through the available list of sounders or direct sources. If the page button 1336 has been touched, step 968 transfers control to step 970 which causes computer 24 to increment the sounder page display and display the next page of available sounders. Thereafter, control is transferred to step 474.

If the page button 1336 was not touched, step 968 transfers control to step 971 which determines if the location touched is a remaining foreground command. If the location is a foreground command the desired sounder has been selected and is activated and placed in the log in step 972 and control is transferred to step 474. If the location touched is not a foreground command, control proceeds to step 973 which removes or filters out any invalid background commands and transfers control to step 420 for processing of the background command.

If the sounder display 1326 is not active in step 962, control transfers to step 974 which causes computer 24 to determine if the operational options display 1328 is active. If so, step 976 checks to see if the back to log button 1338 was touched. If the back to log button 1338 was touched, step 976 transfers control to step 978 which causes computer 24 to redisplay the main working log 1298 and transfers control to step 474.

If the back to log button 1338 has not been touched, control transfers from step 976 to step 980 to determine if the auto mode enable button 1340 has been pressed. If so, step 982 enables and activates the fully automatic mode and transfers control to step 474.

If the auto mode button 1340 has not been touched, step 980 transfers control to step 984 to determine if the recalibrate button 1342 had been touched. This button is used to cause a recalibration of the touch screen sensor system which may at times drift from the previous settings due to various changes in the environment. If the recalibrate button 1342 has been touched at step 984, control is transferred to step 986 which initiates the calibrate touch screen routine. When this routine is finished, control is transferred to step 474.

If the recalibrate button 1342 has not been touched in step 984, control is transferred to step 988 to determine if the reread source files button 1346 had been touched. If so, control is transferred to step 990 which causes the touch screen computer 24 to reread the feed and permanent files which contain the list of hardware connections and the permanent allocations of the tape cartridges as assigned by the program director. After reading these files, control is transferred to step 474.

If the reread button 1346 was not touched in step 988, control is transferred to step 991 which determines if a foreground command has been touched, the only remaining foreground location being the move items button 1344. If so, control proceeds to step 992 which causes all events scheduled to be played prior to the current time to be moved and thereby removed from the log. After all the events have been moved control transfers to step 474.

If the touched location is not a foreground command, step 991 transfers control to step 993 which filters out the invalid background commands and transfers control to step 420 for background command processing.

If the options display 1328 has not been selected in step 974, control is transferred to step 994 to determine if the full log display 1330 as shown in FIG. 17 is active. If so, step 996 causes computer 24 to determine if a move display pointer command has been touched. The display pointer 1350 initially appears in the center of displayed list of log events. The display pointer 1350 is moved to a displayed event by touching that event. The top, bottom, up and down buttons 1314–1320 allow the announcer to display the full list of log events currently resident in the touch screen computer 24. The top button 1314 causes the window to move to place the first event in the log as the first item in the display. Pressing the bottom button 1316 causes the window to move to place the last event in the log to appear as the last event in the window. The up and down buttons 1318 and 1320 scroll the window up or down, respectively, one event. The full list of events can be displayed by appropriately using the top, bottom, up and down buttons 1314–1320. The announcer is able to scan the full list of long events currently resident in the touch screen computer 24 and select events as required.

If a move display pointer command has been indicated, step 996 transfers control to step 998 which causes the window display showing the scheduled log to be moved as appropriate. After moving the window display, control is transferred to step 474.

If the desired action was not to move the display pointer 1350, step 996 transfers control to step 1000 to determine if the announcer has selected the pick location 1348. The pick option allows the announcer to take the event or item indicated by the pointer 1350 and insert it into the log after the last active event. If the pick location 1348 has been touched, step 1000 transfers control to step 1002 which inserts the selected event into the log as the next event and transfers control to step 474.

If the pick location 1348 has not been selected at step 1000, control transfers to step 1003 which determines if the remaining valid foreground location, the back to log button 1352, has been touched. If so, control proceeds to step 1004 which causes a redisplay of the working log display 1298, at which time control is transferred to step 474. If not, step 1003 transfers control to step 1005 which filters out the invalid background commands and transfers control to step 420 for background command processing.

If the full log display 1330 is not active in step 994, control is transferred to step 1006 which investigates to see if the copy display 1354 (FIG. 18) is active. If so, control is transferred to step 1010 to determine if the copy display is in the pick mode or not. If the copy display 1354 is in the pick mode, the displayed characters are the actual text of a selected slug line as shown in FIG. 18 and touching the various cursor or pointer movement buttons page up 1356 and page down 1358 causes the display window to move along the text of the selected slug line. If the pick mode is not selected, the various slug lines available are displayed and a pointer can be moved along the various slug lines available.

If the pick mode is not set, control is transferred from step 1010 to step 1012. Step 1012 determines if the pick button 1360 has been touched. If so, step 1014 sets the picking mode to active and transfers control to step 474. The text of the slug line over which the pointer was positioned will be displayed.

If the pick button 1360 was not touched in step 1012, control is transferred to step 1016 causing computer 24 to determine if the back to log button 1362 has been touched. If so, step 1018 redisplays the main working log display 1298 and transfers control to step 474.

If the back to log button 1362 has not been touched in step 1016, control is transferred to step 1019 which determines if a remaining foreground command area has been touched. If so, control is transferred to step 1020 and the slug line display window is moved along the slug line file as indicated by the selected up or down button 1356 or 1358. The slug line display pointer is moved inside a displayed window of slug lines by touching the desired slug line and the pointer moves to the touched location. After moving the slug line display window, control is transferred to step 474.

If the area touched was determined not to be a foreground command in step 1019, control proceeds to step 1021 for invalid background command filtering and transfers to step 420 for processing.

If the pick mode has been set, control is transferred from step 1010 to step 1022 to determine if the pick button 1360 has been touched. If so, this indicates that the announcer is done reading the text for that particular slug line and step 1024 resets the picking mode to off and transfers control to step 474.

If the pick button 1360 has not been depressed, step 1022 transfers control to step 1026 to determine if the back to log button 1352 has been touched. If so, step 1028 causes a redisplay of the main working log display 1298 and control is transferred to step 474.

If the back to log button 1362 has been not been touched, step 1026 transfers control to step 1029 to determine if the area touched is a remaining foreground command area. If so, control is transferred to step 1030 and the display window is moved along the slug line text as desired by the indicated button. After moving the display window, control is transferred to step 474.

If step 1029 determined that the touch was not in a foreground area, control transfers to step 1021 for filtering and to step 420 for processing.

If the copy display 1354 is not active in step 1006, this means that the system is operating in the automatic mode and the automatic mode button 1340 has been pressed to shut off the automatic mode. In the automatic mode the options display 1328 is active and displayed, but only the auto button 1340 is active, with the other buttons not producing a response. Step 1008 turns off the auto mode and displays the main working log 1298, returning the control of the events to the announcer. After returning to normal mode, step 1008 transfers control to step 474.

3. TIMER Sequence

Figure 5:
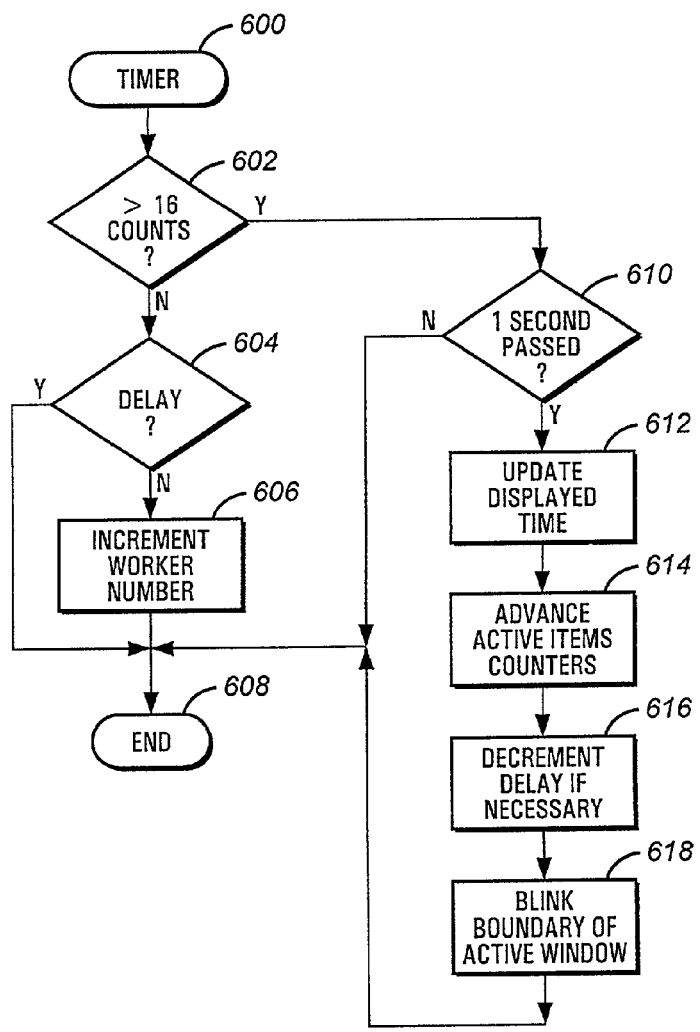

The TIMER sequence 600 (FIG. 5) is used to update the displayed time on the touch screen computer 24 and advance the active item counters. TIMER sequence 600 begins execution at step 602. Step 602 causes computer 24 to determine if 16 counts of the timer interrupt have occurred. The timer interrupt is based on a real time clock which interrupts the touch screen computer 24 at periodic intervals and executes a very short routine. The timer interrupt routine only increments the counter that indicates how many interrupts have occurred since the counter was last cleared.

If more than 16 timer interrupts have occurred since the last time the TIMER sequence 600 was executed, step 602 transfers control to step 610. Step 610 clears the counter and determines if one second has passed since the last update in which case it is time to update the displays and advance the active event counters. If one second has not passed, control is passed to step 608 which is the return or end of the sequence.

If one second has passed, step 610 transfers control to steps 612–618 which in sequence update the displayed time indicated on the touch screen computer 24, advance the active item counters on all of the various active events shown on the working log display, decrement any possible delay counters that exist and blink the boundary 1294 between the active events and the inactive events. After step 618, control is transferred to step 608 for a return from the sequence.

If 16 timer interrupts counts have not elapsed, step 602 transfers control to step 604. Step 604 determines whether the desired delay period has been completed. This is used as previously indicated when an event has just been activated. If the delay function is still active, control is passed from step 604 to step 608 preventing execution of the other multi-task functions. If the delay is not active, step 604 transfers control to step 606 which increments the worker function which is used to indicate which multi-task function is to execute during the next multi-task function period. The increment in step 606 indicates that the next function to be performed by the computer 24 when it re-enters the multi-tasking function is the screen update function. After incrementing the worker number, control is passed to step 608 which returns control from the TIMER sequence 600 to the main program at step 412.

4. Screen Update

The screen update function is second in priority in the multi-tasking functions after the TIMER sequence 600 and is used to scroll the working log display 1298 as necessary as events are activated and deactivated. This is done because it is desired that the active event displays appear at the top of the working log display for easy reference by the announcer. After the screen update has occurred the screen update function increments the worker number so that at the next activation of the multi-task function the file handler sequence 630 is performed.

5. File Handler Sequence

Figure 6:
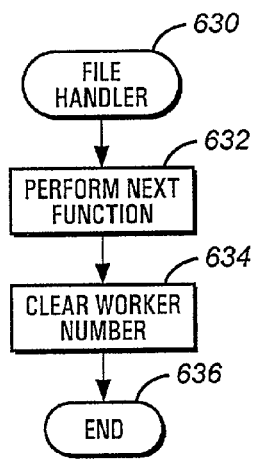

The File Handler Sequence 630 (FIG. 6) is used to oversee and control the various subfunctions performed by the file handler. The file handler sequence 630 is a multi-talking sequence much like the multi-tasking function in that it works the same way by directing control to the proper function and subfunction. This transfer is done in step 632 where the next function in the schedule is performed. After performing the appropriate function or subfunction, control returns to step 634 where the worker number is cleared. This is done to complete the sequence of the multi-tasking function so that the next multi-tasking function to be performed is the TIMER sequence 600. After clearing the worker number in step 634, control is transferred to step 636, the return from the routine to the main program.

The various functions performed by the file handler include looking for messages from the director's computer 20, determining if the director's computer 20 has generated a new tray configuration list, checking the status of events to see if they should be added to the output log, reading a new hourly log into the touch screen computer 24, checking for and reading extra events, and determining if the program director is requesting the current configuration of trays. These sequences are all explained in detail in the following sections.

6. MESSAGE Sequence

Figure 7:
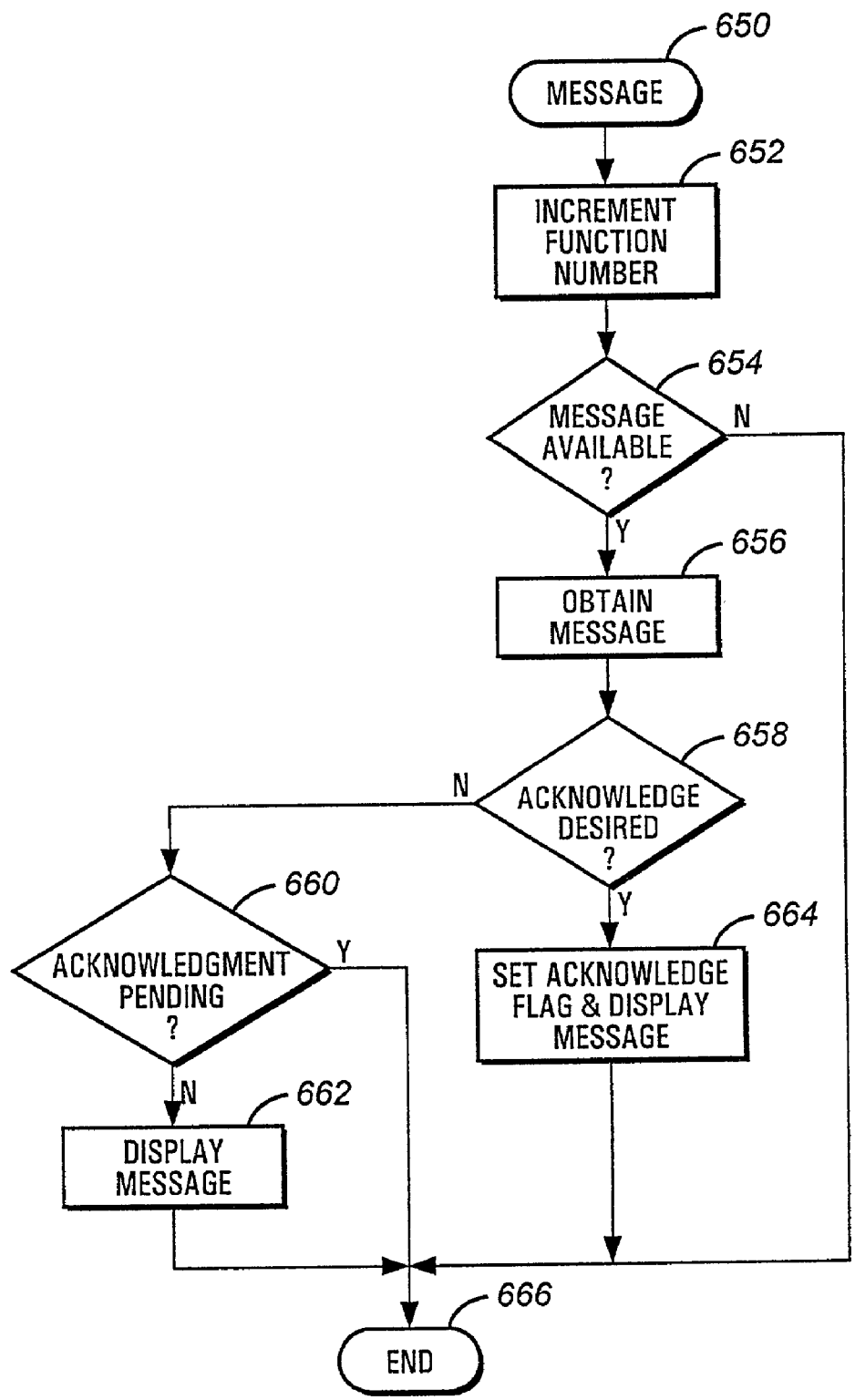

The MESSAGE sequence 650 (FIG. 7) determines if a message has been sent from the director computer 20 to the file server computer 22. If a message to be displayed on the touch screen computer 24 does exist in the file server computer 22, the MESSAGE sequence 650 retrieves the message and displays it.

The MESSAGE sequence 650 commences in step 652 by incrementing the function number. This advances the function to be performed the next time the file handler sequence 630 is executed. After the function number is incremented, step 654 determines if a message is available. If not, step 654 transfers control to step 666.

If a message is available, step 654 transfers control to step 656 which obtains the message from the file server computer 24. After obtaining the message, step 658 determines if an acknowledgment is required by the announcer. If so, 664 sets the acknowledge required flag, displays the message in the message area 1296 and retrieves the message from the file server computer 22. After retrieving the message, control is transferred to step 666.

If an acknowledgment is not required, control is transferred from step 658 to step 660 which causes computer 24 to determine if an acknowledgment request is currently pending. If not, the message is displayed in step 662 and the message is removed from the file server computer 22.

If an acknowledgment is pending, control is passed from step 660 to step 666. This transfer is done because it is desirable to have no messages displayed on the touch screen until the announcer has acknowledged a message that the program director wishes acknowledged. Step 666 is the return from the routine to the file handler sequence 630.

7. TRAYIN Sequence

Figure 8A:
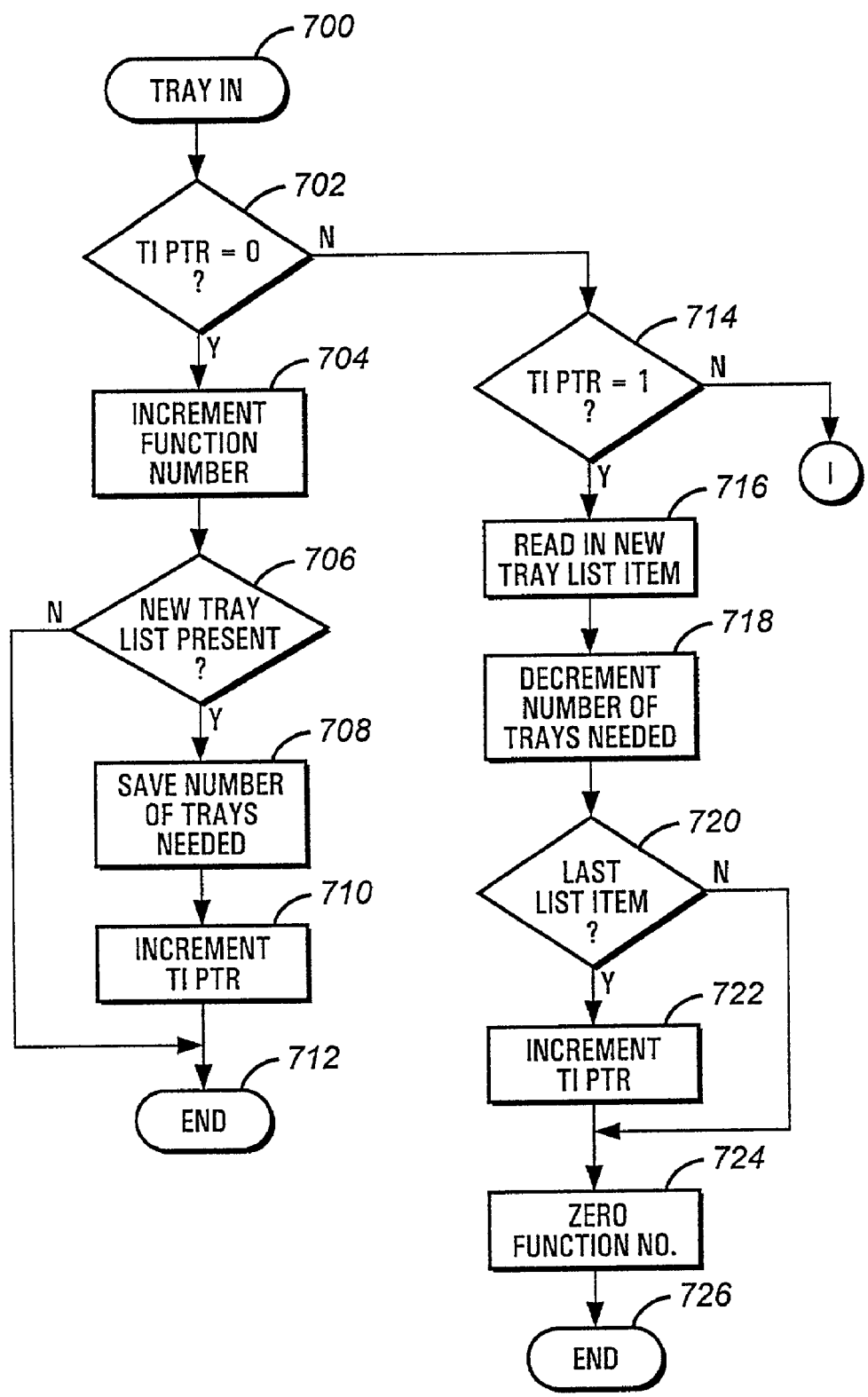
Figure 8B:
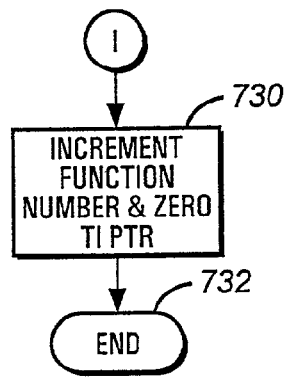

The TRAYIN sequence 700 is shown in FIGS. 8A and 8B and causes computer 24 to determine if the program director has generated a new tray configuration file that the touch screen computer 24 must read to determine the future tray configuration and the hardware mapping.

The TRAYIN sequence 700 begins execution at step 702 which determines if the TRAYIN pointer is equal to zero. This is necessary because the TRAYIN sequence 700 consists of three subfunctions because of the time constraints previously mentioned. If the TRAYIN sequence 700 were to be executed as one long sequence, it could possibly extend beyond the one second maximum allowed. The TRAYIN pointer is used to control which segment is active in the TRAYIN sequence 700.

If the TRAYIN pointer is zero, step 702 transfers control to step 704 which increments the function number. This is done so that the next pass through the file handler will not cause the execution of the TRAYIN sequence but will perform the OLOGER sequence 750. This rapid sequencing through the file handler functions is done to improve the transparency of the system to the user.

After incrementing the function number, step 706 determines if the new tray list is present. If not, control is transferred to step 712. If a new tray list is present, step 708 saves the number of trays needed and step 710 increments the TRAYIN pointer to point to the next TRAYIN subfunction. After this, control passes to step 712 which is a return from the sequence 700 to the file handler sequence 630.

If the TRAYIN pointer is not equal to zero, step 702 transfers control to step 714 which determines if the TRAYIN pointer is one. If the TRAYIN pointer is one, step 716 reads in a new tray list item from the file server computer 22. The tray list is read in item-by-item because the it can be quite long and the time to read it in its entirety could exceed the one second time allotment.

After reading in the tray item, step 718 decrements the number of trays needed and step 720 determines if the last item in the tray list has been read. If not, control is transferred to step 724.

If the last item was read, step 722 increments the TRAYIN pointer to point to the final TRAYIN subfunction. After incrementing the pointer, step 722 transfers control to step 724 which zeros the function number to cause the next pass through the file handler sequence 630 to determine if a message must be obtained. After zeroing the function number, control is passed to step 726, a return from the TRAYIN sequence 700.

If the TRAYIN pointer is not one, control is transferred to step 730 which increments the function number and zeros the TRAYIN pointer. At this time step 732 returns control to the file handler sequence 630. The increment of the function number causes the OLOGER sequence 750 to execute during the next entry into the file handler sequence 630, while zeroing the TRAYIN pointer causes the TRAYIN sequence 700 to look for a new tray list the next time the sequence 700 is executed.

8. OLOGER Sequence

Figure 9A:
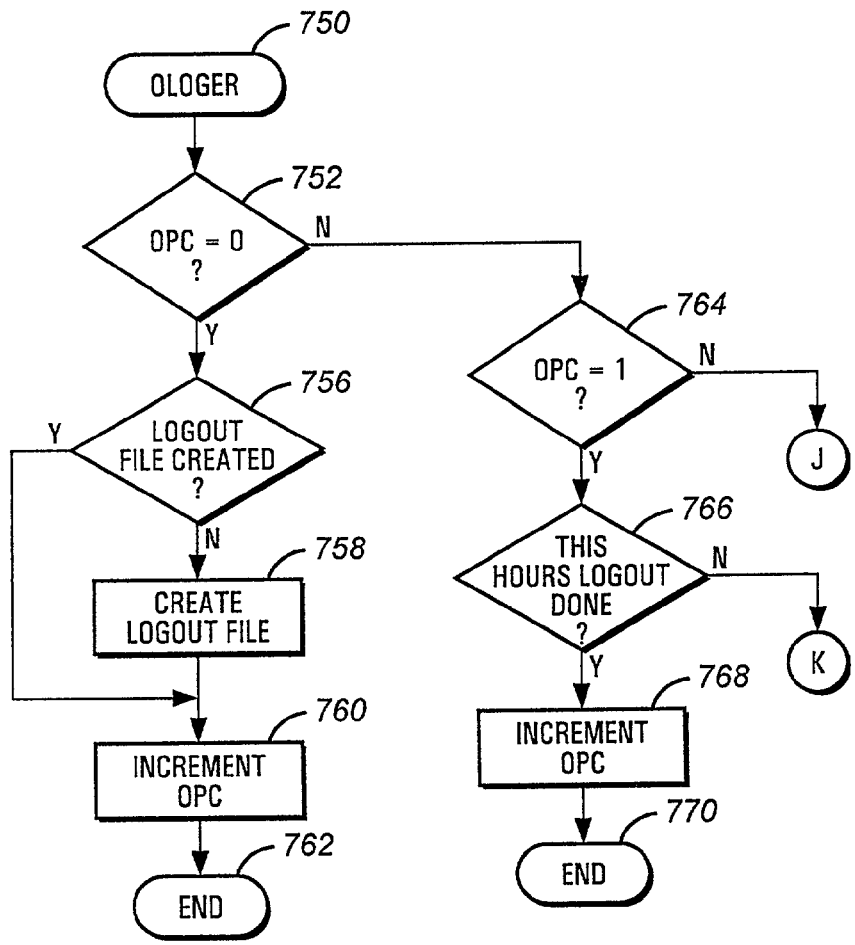
Figure 9B:
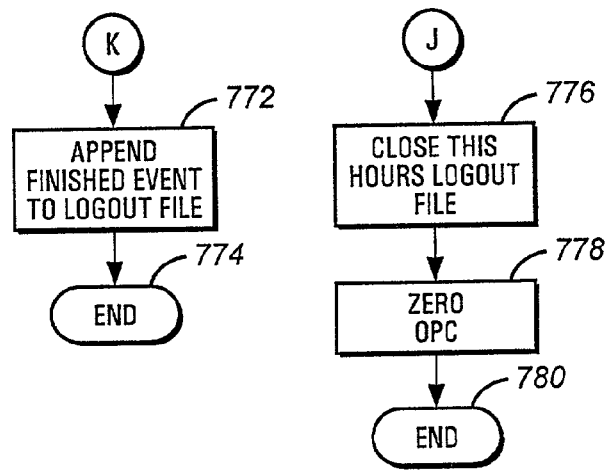

The OLOGER sequence 750 (FIG. 9) is used to check the status of the events to determine if it is time to add a completed event into the proper output log file. The output log sequence 750 is comprised of a number of subfunctions that it performs. Therefore, step 752 determines if the output log counter is equal to zero. If so, step 752 transfers control to step 756 which determines if the proper hourly log output file has been created. If so, step 756 transfers control to step 760. If the hourly log file has not been created, it is created by step 758. Step 760 then increments the output log counter and transfers control to step 762 which is a return from the OLOGER sequence to the file handler sequence 630.

If the output log counter is not equal to zero, step 764 determines if the counter is equal to one. If so, step 766 determines if the hourly log output file is finished. If this hours log output file is done, step 768 increments the output log counter and step 770 returns control to the file handler sequence 630. If this hours log output is not done, step 766 transfers control to step 772 which appends the finished event information to the log output file and control is returned to the file handler sequence 630 by step 774.

If the output log counter is not equal to one in step 764, step 776 closes the hourly log output file, step 778 zeros the output log counter to cause the OLOGER sequence 750 to recirculate and step 780 returns control to the file handler sequence 630.

9. LOGER Sequence

Figure 10A:
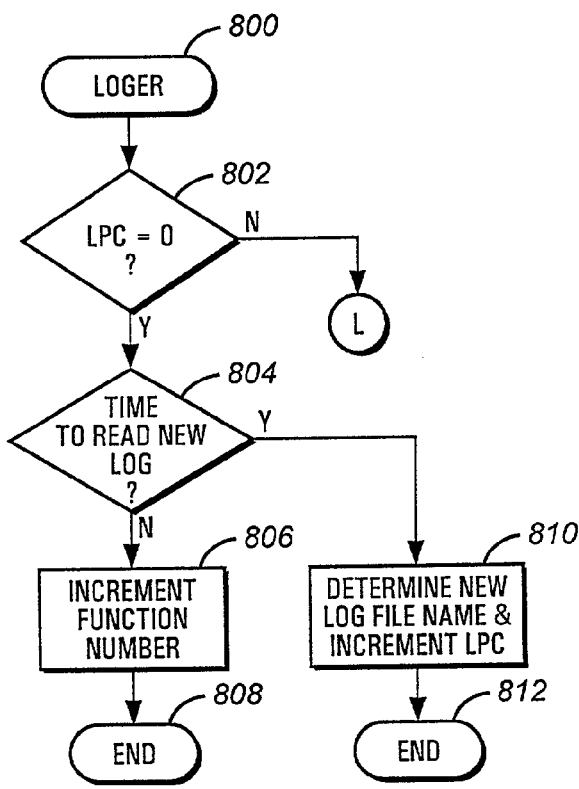
Figure 10B:
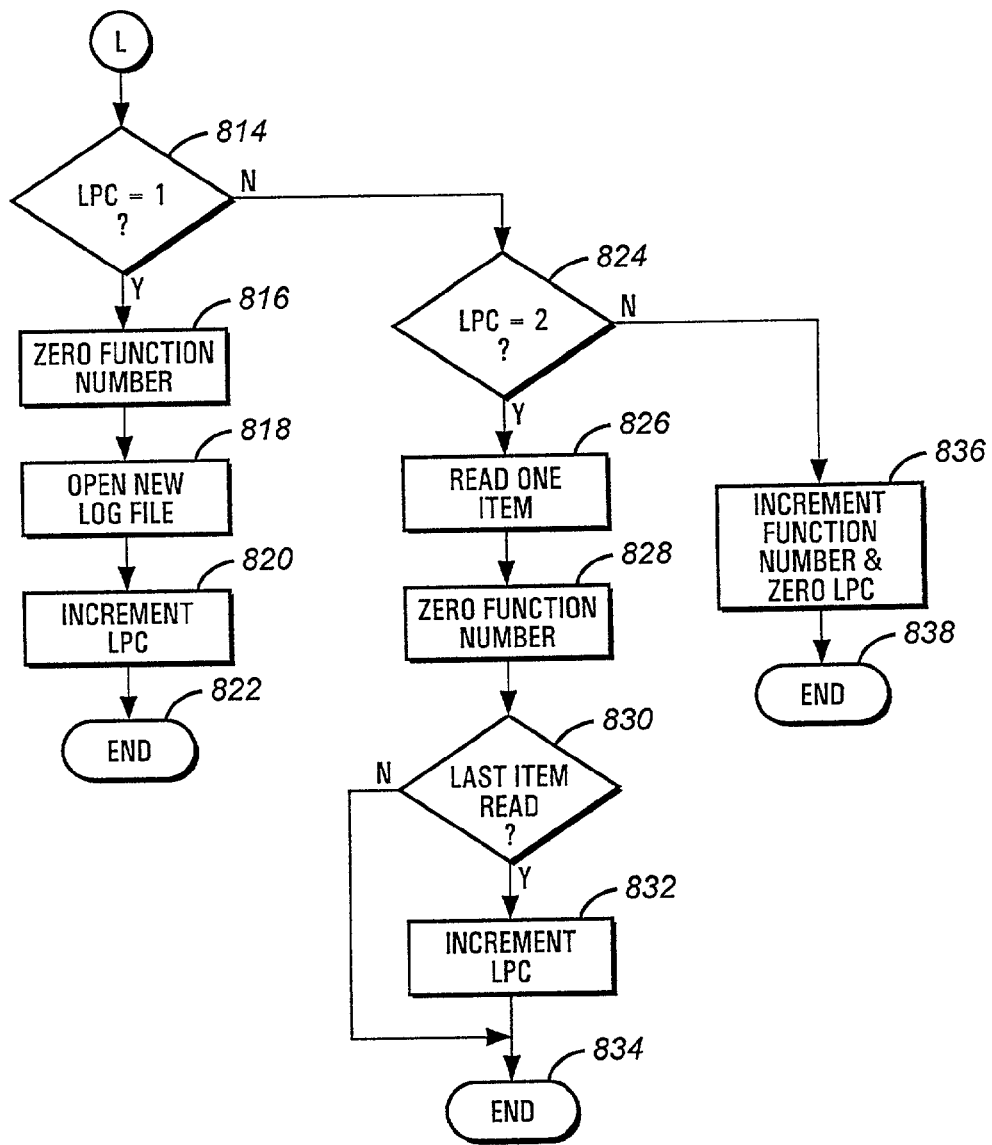

The LOGER sequence 800 (FIG. 10) causes computer 24 to read the next hourly log into the touch screen computer 24 ten minutes before the end of each current hour. This reading of only hourly log segments reduces the memory requirements of the touch screen computer 24 and simplifies the searching tasks of the computer 24 and the announcer if he is scanning the various log displays. The LOGER sequence 800 has a number of subfunctions. Therefore, step 802 causes computer 24 to determine if the LOGER program counter is zero. If so, step 804 determines if it is time to read in a new log. If it is not time to read in a new log, step 806 increments the function number to indicate that the LOGER function is not needed for at least another pass through the file handler tasks. After incrementing the function number, control is passed to step 808 which returns control to the file handler sequence 630.

If it is time to read a new log, step 804 transfers control to step 810 which determines the appropriate hourly log file name and increments the LOGER program counter to point to the next LOGER subfunction. After incrementing, control is returned to the file handler sequence 630 by step 812.

If the LOGER program counter is not equal to zero in step 802, step 814 determines if the LOGER program counter is equal to one. If so, step 816 zeros the function number, step 818 opens the new log file for access, step 820 increments the log program counter and step 822 returns control to the file handler sequence 630.

If the LOGER program counter is not equal to one, step 824 determines if the LOGER program counter is equal to two. If so, a single log item is read in step 826 because of time constraints and the function number is zeroed in step 828 to recirculate to the message sequence 650 on the next pass through the file handler sequence 630. Step 830 then causes computer 24 to determine if the last item in the hourly log was read. If not, step 830 transfers control to step 834. If the last item or event was just read, step 832 increments the LOGER program counter and transfers control to step 834. Step 834 is the return to the file handler sequence 630.

If the log program counter is not equal to two in step 824, step 836 increments the function number to indicate the LOGER sequence 800 is finished and zeros the LOGER program counter to cause the LOGER sequence subfunctions to execute again. Step 838 then returns control to the file handler sequence 630.

10. LOOKXTRA Sequence

Figure 11:
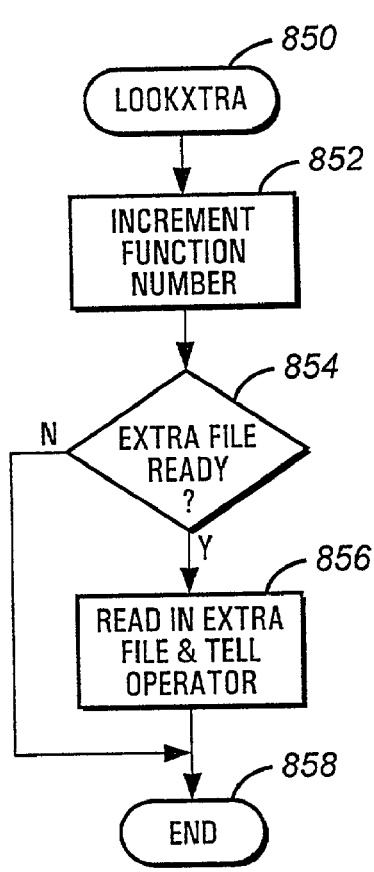

The LOOKXTRA sequence 850 (FIG. 11) causes computer 24 to determine if the program director has created extra events which need to be read into the log sequence and scheduled at the end of the current log. This sequence 850 begins executing at step 852 by incrementing the function number. This will cause an advance to the TRAYOUT sequence 900 on the next pass through the file handler sequence 630. At step 854 it is then determined whether an extra events file is ready in the file server computer 22. If not, control is transferred to step 858. If an extra events file is ready, step 856 causes computer 24 to read the extra events file and put a message on the touch screen so that the announcer knows that a number of extra events have just been read. This enables the announcer to place the extra events into the log using the pick extra function.

11. TRAYOUT Sequence

Figure 12A:
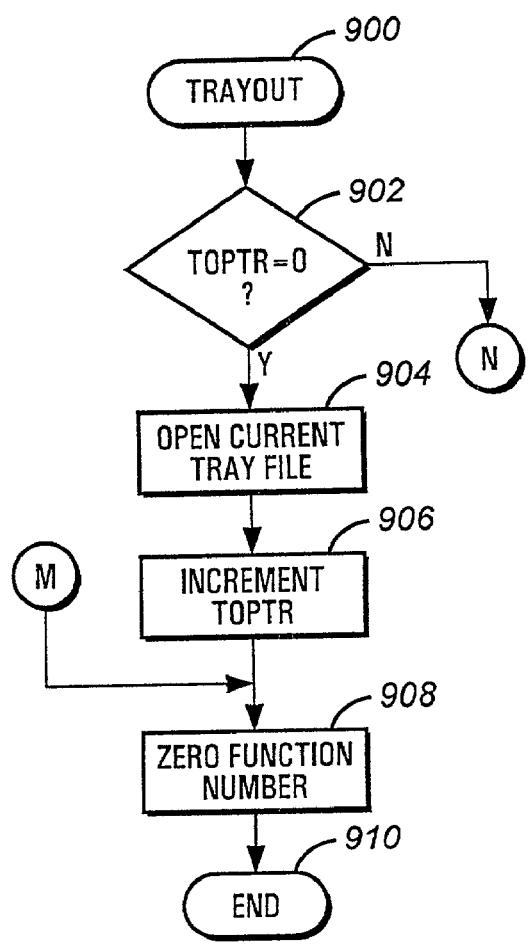
Figure 12B:
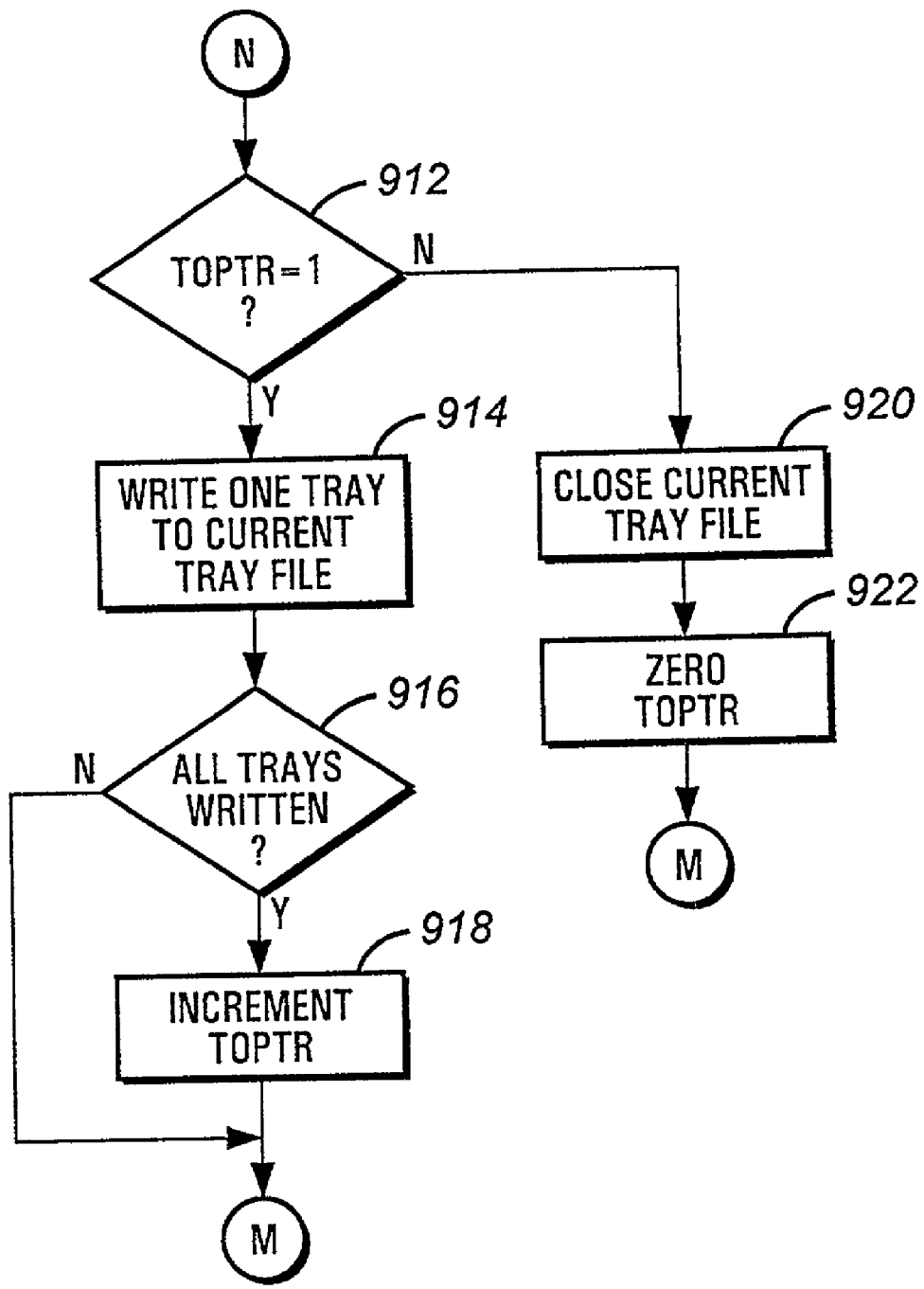

The TRAYOUT sequence 900 (FIG. 12) causes computer 24 to determine if the program director is requesting the current configuration of the trays that are to be used by the touch screen computer 24 and to generate the list to be transmitted to the director's computer 20.

The TRAYOUT sequence 900 is a longer sequence and therefore is broken up into three subfunctions. Step 902 causes computer 24 to determine if the TRAYOUT pointer is equal to zero. If so, the first TRAYOUT subfunction is performed in step 904 which opens the current tray file in the file server computer 22 to receive data. The TRAYOUT pointer is incremented in step 906 and the function number is zeroed in step 908 to cause the file handler task scheduler to recirculate to the message sequence 650. After zeroing the function number, step 910 returns control to the file handler sequence 630.

If the TRAYOUT pointer is not equal to zero, step 902 passes control to step 912 to determine if the TRAYOUT pointer is equal to one. If so, step 914 writes the information regarding the use of a single tray to the current tray file which was opened in step 904. Step 916 then determines if all the trays have had their information written. If so, step 918 increments the TRAYOUT pointer and transfers control to step 908 which is also where control would transfer if the trays were not all written.

If the TRAYOUT pointer is not equal to one, step 912 transfers control to step 920 which closes the current tray file because all the trays have now been written and step 922 zeros the TRAYOUT pointer so that the next execution of the TRAYOUT sequence 900 will cause computer 24 to determine if the current tray file needs to be opened. Control is then transferred to step 908 to zero the function number and cause a return to the file handler sequence 630.

IV. Example Programming Sequence

For further explanation of this system it is appropriate to describe an exemplary sequence using system S to broadcast or air several events. The director computer sequence will be described first with the touch screen computer system described thereafter.

To start the sequence the program director captures the log from the billing computer 26 or enters the log manually. After receiving the log from the billing computer 26 the program director enters the edit log mode and adjusts the log to match his preferred schedule. The program director then generates a tray allocation report to establish the location of all the various tape cartridges and other devices and a tray change list to determine which tapes need to be relocated. Generally the program director also produces the printout of the previous day's output log to be reviewed by both the marketing department and himself.

There are a number of events that the program director can do at any time during the broadcast day. If he decides that an extra event needs to be added to the log of events currently in the touch screen computer 24, he can create an extra event and send it to the touch screen computer 24 for the announcer to insert. He can also decide to change the log events not yet read into the announcer's computer 24 and then regenerate the tray allocation list as needed. He does not have to use the extra event technique for the events not yet read into the touch screen computer 24. Additionally the program director can change or edit the files that describe the physical connection of the hardware devices, the various sources and the mapping required by the touch screen computer 24 to correctly activate and route a source to the appropriate destination.

A typical announcer sequence would be as follows. The announcer would be viewing the working log display 1298, with various events scheduled to become active and one event that is active. If, for example, the announcer decides that the weather report should air after the current event and the weather report is not one of the events shown in the inactive area of the working log display, he first touches the full log button 1364 which causes the full log to be displayed, with the current event in the center. The announcer then scans the full log display 1330 until a weather report event is highlighted and actuates the pick item button 1348. This places the weather report as the first inactive event. The announcer then actuates the back to log button 1352 and exits the full log mode to the working log display 1298. As the current event finishes, the announcer actuates the ON button on that event, turning it OFF, and the START button on the weather report, turning it on and active.

If the announcer decides to play a commercial during the weather report, he again touches the full log button 1364 to see the various events available. He scans the various events and actuates the pick button 1348 to select the desired commercial and returns to the working log display 1298. When the appropriate point in the weather report occurs, he touches the HOLD button 1310 on the weather report line, and the START button on the commercial, temporarily deactivating the weather and activating the commercial. When the commercial is finished he touches the ON button on the commercial line, shutting it off and actuates the weather report HOLD button 1310, reactivating the weather.

If he would like to read the stock market report from the copy he proceeds as follows. He touches the sounder button 1366 and then the ticker tape sounder 1368 when it appears on the display 1326, logging the sounder. He leaves the sounder display 1326, activates the sounder and actuates the remote source button 1370. When the menu appears he activates his microphone. He then leaves the direct menu 1324 and enters the copy display 1354. Once in the copy display 1354 he scans the sluglines for the stock market report and touches the pick button 1360 to display the text. He then actuates the FADE portion 1308 of the sounder line which is active and begins speaking into his microphone. The switcher/mixer 70 mixes the two sources, creating a stock report with a ticker tape in the background. When the announcer is finished he leaves the copy menu 1354, deactivates his microphone, unfades the sounder and shuts off the sounder after an appropriate time. He then turns on the next scheduled event and broadcasting continues.

If the announcer wished to have a conversation broadcast over the air, he would proceed as follows. He would activate his microphone via the direct menu 1326. He would then actuate the phone button 1372 to receive an incoming call. Any profanity or libelous words that could not be broadcast can be muted via delay button 1324. The conversation is terminated when the announcer touches the phone button 1372. He could then turn off his microphone and proceed to the next scheduled event.

If a longer event was playing and the announcer needed to preview an event he would find the appropriate event on the log and cue the event which would then broadcast over the studio monitor bus to his headphones. In this way one event can be broadcast while another is previewed, He would then touch the cue button 1312 to shut off the event and reset it.

As can be seen, the system of the present invention makes it very easy for the announcer to reschedule events or to meet the press of unusual circumstances as they arise.

V. Conclusion

It can be seen this is a very complete system which has several distinct advantages over the prior art in that it allows a non-skilled announcer to effectively manage the master studio console in a radio station, a television station or any audio or video production studio.

A television station can easily be controlled using the present invention by modifying the various menus displayed as required for the various different details of operation of a television studio and changing the audio sources to audio and video sources. This would allow the announcer to switch between cameras and various prerecorded video tapes or laser discs as deemed necessary. An audio or video production studio can also use the present invention because even though they do not transmit a signal over the air waves, they have similar mixing and switching requirements to produce their products which require complex switching/mixing consoles and skilled operators.

The foregoing disclosure and description of the invention are illustrative and explanatory thereof, and various changes in the size, shape and materials, as well as in the details of the illustrated construction may be made without departing from the spirit of the invention.

The invention claimed is:

1. A system for interactive management of audio events from a plurality of audio sources, the system comprising:
   at least one audio source associated with a plurality of audio events;
   a touch screen computer having a touch screen display coupled to the audio source for selection of audio events, the touch screen computer generating a schedule of audio events comprising the selected audio events;
   a memory coupled to the touch screen computer for storing the schedule of audio events; and
   means for playing the audio events from the associated audio source according to the schedule of audio events.

2. The system of claim 1, wherein the schedule of audio events are displayed on the touch screen display.

3. The system of claim 1, wherein the schedule of audio events is generated capable of modification.

4. The system of claim 3, wherein the schedule of audio event can be modified by touching displayed schedule of audio events according to various modifying options.

5. The system of claim 4, wherein a modifying option comprises deactivation and activation of an audio event of the schedule of audio events.

6. The system of claim 4, wherein a modifying option comprises reordering of the audio events of the schedule of audio events.

7. The system of claim 1, wherein the selection of an audio events results in immediate play of the selected audio events.

8. The system of claim 1, the touch screen computer further comprising:
   a switch coupled to the audio source, the switch activated by the touch screen computer according to the selection of an audio event and the audio source associated with the selected audio event.

9. The system of claim 1, wherein the audio source is a compact disc.

10. The system of claim 1, wherein the audio source is a computer file.

11. The system of claim 10, wherein the computer file is stored in the memory.

12. The system of claim 1, wherein the audio source is a remote source accessed by the touch screen computer via a telephone line.

13. The system of claim 1, wherein the audio source is a remote source accessed by the touch screen computer via a satellite feed.

14. The system of claim 1, further comprising a plurality of audio sources associated with the plurality of audio events.

15. A method for playing audio events from a plurality of audio sources using an interactive touch screen video system, the method comprising the steps of:
   associating in a memory a plurality of audio events with an audio source;
   displaying representations of a plurality of audio events on a touch screen display;
   selecting a plurality of audio events by touching the displayed representation of the audio event;
   storing a schedule of audio events from the selected audio events in a memory log; and
   playing the audio events from the associated audio source according to the schedule of audio events in the memory log.

16. The method of claim 15, further comprising the steps of:
   displaying the schedule of audio events on the touch screen display; and
   modifying the schedule of audio events by touching the displayed schedule of audio events according to various modifying options.

17. The method of claim 15, further comprising the step of:
   associating a plurality of audio sources associated with a plurality of audio events.

* * * * *

UNITED STATES PATENT AND TRADEMARK OFFICE
CERTIFICATE OF CORRECTION

| | | |
|---|---|---|
| PATENT NO. | : 7,130,778 B1 | Page 1 of 1 |
| APPLICATION NO. | : 09/617695 | |
| DATED | : October 31, 2006 | |
| INVENTOR(S) | : John M. Connell et al. | |

It is certified that error appears in the above-identified patent and that said Letters Patent is hereby corrected as shown below:

Related U.S. Application Data - "Continuation of application No. 07/474,682, filed on Feb. 6, 1990, now Pat. No. 6,101,324" should be --Continuation of application No. 07/474,682, filed Feb. 6, 1990, now Pat. No. 6,101,324, which is a continuation of application No. 07/281,903, filed Dec. 6, 1988, now abandoned, which is a continuation of application No. 06/805,888, filed on Dec. 6, 1985, now abandoned.--

Signed and Sealed this

Twenty-seventh Day of February, 2007

JON W. DUDAS
*Director of the United States Patent and Trademark Office*